(12) United States Patent
Furusato et al.

(10) Patent No.: US 10,283,927 B2
(45) Date of Patent: May 7, 2019

(54) LINE NARROWED LASER APPARATUS

(71) Applicant: Gigaphoton Inc., Tochigi (JP)

(72) Inventors: Hiroshi Furusato, Oyama (JP); Takeshi Ohta, Oyama (JP); Natsuhiko Kouno, Oyama (JP); Osamu Wakabayashi, Oyama (JP); Takahito Kumazaki, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/033,030

(22) Filed: Jul. 11, 2018

(65) Prior Publication Data

US 2018/0323568 A1    Nov. 8, 2018

Related U.S. Application Data

(63) Continuation of application No. PCT/JP2016/053068, filed on Feb. 2, 2016.

(51) Int. Cl.
| | |
|---|---|
| *H01S 3/134* | (2006.01) |
| *H01S 3/08* | (2006.01) |
| *H01S 3/11* | (2006.01) |
| *H01S 3/034* | (2006.01) |

(Continued)

(52) U.S. Cl.
CPC .............. *H01S 3/11* (2013.01); *H01S 3/034* (2013.01); *H01S 3/038* (2013.01);
(Continued)

(58) Field of Classification Search
CPC ...... H01S 3/2222; H01S 3/2207; H01S 3/137; H01S 3/034; H01S 3/11; H01S 3/08009; H01S 3/134; H01S 3/038

(Continued)

(56) References Cited

U.S. PATENT DOCUMENTS

| | | |
|---|---|---|
| 6,870,865 B2 | 3/2005 | Nagai et al. |
| 7,643,522 B2 | 1/2010 | Trintchouk et al. |
| | (Continued) | |

FOREIGN PATENT DOCUMENTS

| | | |
|---|---|---|
| JP | 2001-196679 A | 7/2001 |
| JP | 2001-307997 A | 11/2001 |
| | (Continued) | |

OTHER PUBLICATIONS

International Search Report issued in PCT/JP2016/053068; dated Apr. 19, 2016.

(Continued)

*Primary Examiner* — Tuan N Nguyen
(74) *Attorney, Agent, or Firm* — Studebaker & Brackett PC

(57) ABSTRACT

The line narrowed laser apparatus configured to perform a plurality of burst oscillations including a first burst oscillation and a second burst oscillation next to the first burst oscillation to output a pulse laser beam. The line narrowed laser apparatus comprises a laser resonator, a chamber provided in the laser resonator, a pair of electrodes provided in the chamber, an electric power source configured to apply a pulsed voltage to the pair of electrodes, a wavelength-selecting element provided in the laser resonator, a spectral width varying unit provided in the laser resonator, a wavelength variable unit configured to change a selected wavelength selected by the wavelength-selecting element, and a controller. The controller is configured to control the wavelength variable unit based on an amount of control of the spectral width varying unit in a period from a time of ending the first burst oscillation to a time of starting the second burst oscillation.

20 Claims, 22 Drawing Sheets

(51) Int. Cl.
H01S 3/038 (2006.01)
H01S 3/137 (2006.01)
H01S 3/22 (2006.01)

(52) U.S. Cl.
CPC .......... *H01S 3/08009* (2013.01); *H01S 3/134* (2013.01); *H01S 3/137* (2013.01); *H01S 3/2207* (2013.01); *H01S 3/2222* (2013.01)

(58) Field of Classification Search
USPC .......................................................... 372/25
See application file for complete search history.

(56) References Cited

U.S. PATENT DOCUMENTS

2007/0014326 A1* 1/2007 Wakabayashi ...... H01S 3/08009
372/92
2012/0250708 A1* 10/2012 Onose .................. H01S 3/2316
372/25

FOREIGN PATENT DOCUMENTS

| JP | 2003-051633 A | 2/2003 |
| JP | 2008-098282 A | 4/2008 |
| JP | 2008-527683 A | 7/2008 |

OTHER PUBLICATIONS

International Preliminary Report on Patentability and Written Opinion issued in PCT/JP2016/053068; dated Aug. 7, 2018.

* cited by examiner

FIG. 8
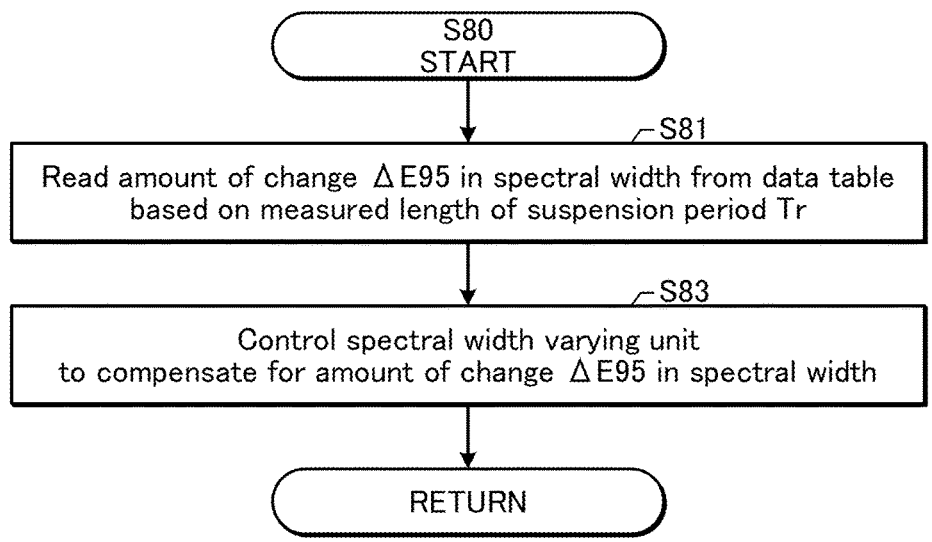
FIG. 9
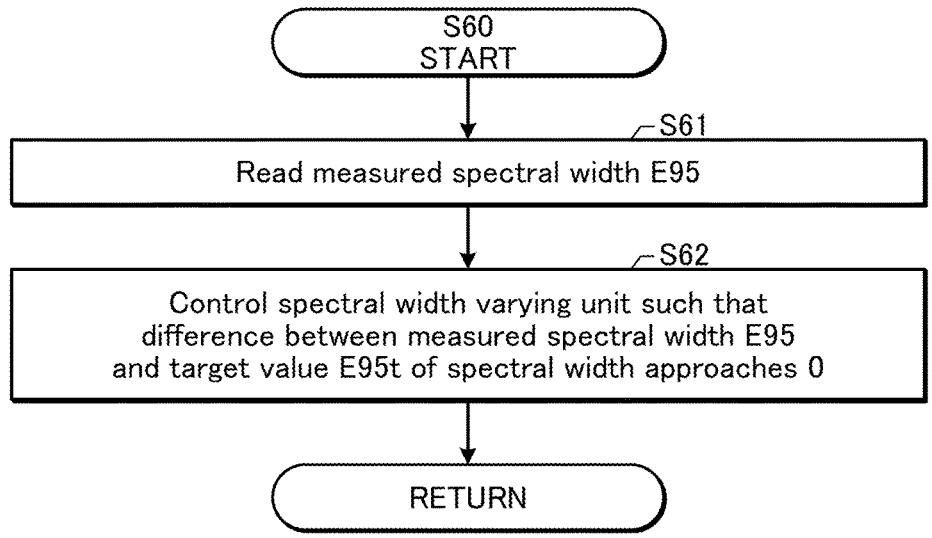
FIG. 10
| SUSPENSION PERIOD Tr | Tr(1) | Tr(2) | ... | Tr(n) |
|---|---|---|---|---|
| AMOUNT OF CHANGE ΔE95 IN SPECTRAL WIDTH | ΔE95(1) | ΔE95(2) | ... | ΔE95(n) |

FIG. 17
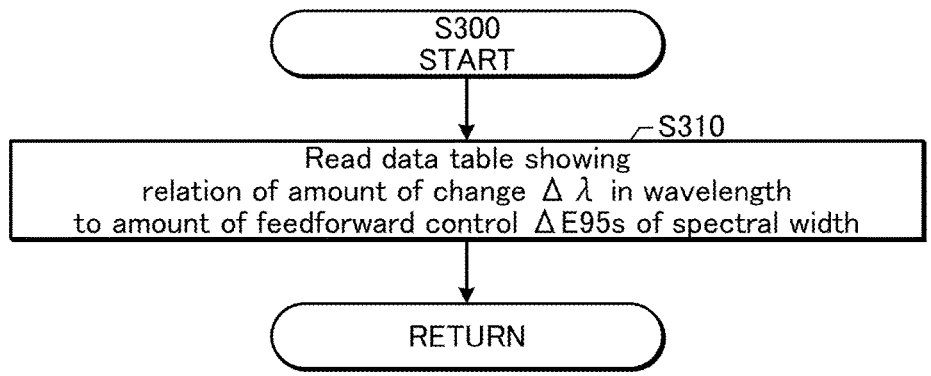
FIG. 18
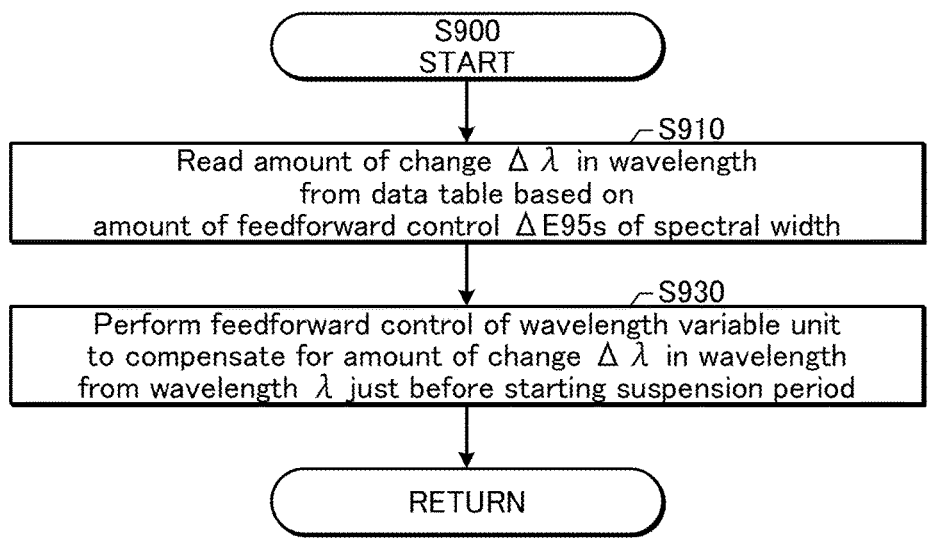
FIG. 19
| AMOUNT OF FEEDFORWARD CONTROL $\Delta E95s$ OF SPECTRAL WIDTH | $\Delta E95s(1)$ | $\Delta E95s(2)$ | ... | $\Delta E95s(n)$ |
|---|---|---|---|---|
| AMOUNT OF CHANGE $\Delta \lambda$ IN WAVELENGTH | $\Delta \lambda(1)$ | $\Delta \lambda(2)$ | ... | $\Delta \lambda(n)$ |

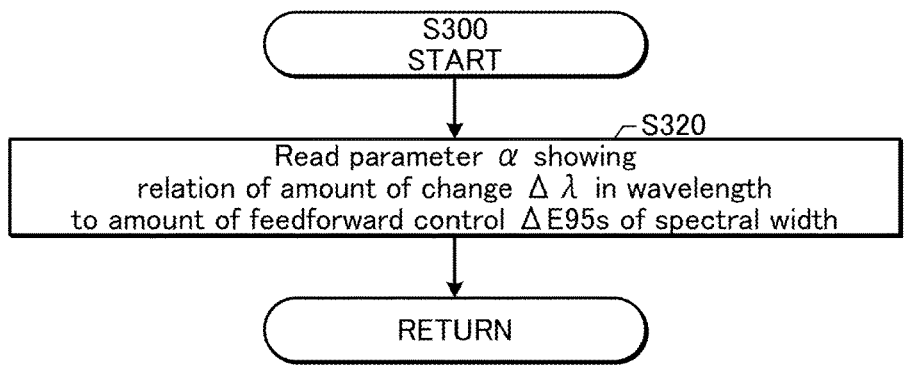
FIG. 20
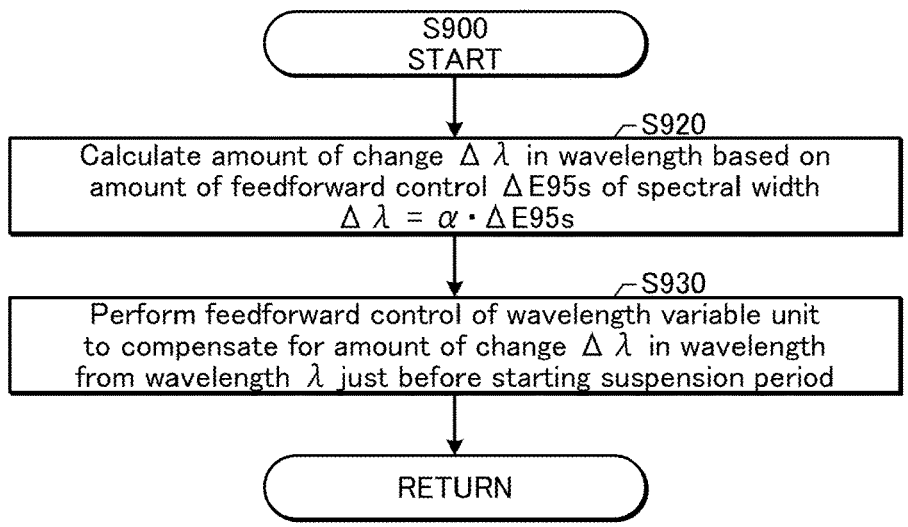
FIG. 21
FIG. 22

| | | SUSPENSION PERIOD Tr | | | |
|---|---|---|---|---|---|
| | | Tr(1) | Tr(2) | ··· | Tr(n) |
| DUTY D IN PREVIOUS BURST OSCILLATION | D(1) | Δλs (1,1) | Δλs (1,2) | ··· | Δλs (1,n) |
| | D(2) | Δλs (2,1) | Δλs (2,2) | ··· | Δλs (2,n) |
| | D(3) | Δλs (3,1) | Δλs (3,2) | ··· | Δλs (3,n) |
| | ··· | ··· | ··· | ··· | ··· |
| | D(m) | Δλs (m,1) | Δλs (m,2) | ··· | Δλs (m,n) |

LINE NARROWED LASER APPARATUS

TECHNICAL FIELD

The present disclosure relates to a line narrowed laser apparatus.

BACKGROUND ART

The recent miniaturization and increased levels of integration of semiconductor integrated circuits have led to a demand for increases in the resolutions of semiconductor exposure apparatuses. A semiconductor exposure apparatus is hereinafter referred to simply as "exposure apparatus". Accordingly, exposure light sources to output light at shorter wavelengths have been under development. As the exposure light sources, gas laser apparatuses instead of conventional mercury lamps are typically used. The gas laser apparatuses for exposure include a KrF excimer laser apparatus that outputs an ultraviolet laser beam at a wavelength of 248 nm and an ArF excimer laser apparatus that outputs an ultraviolet laser beam at a wavelength of 193 nm.

As a current exposure technology, immersion exposure has been put into practical use. In the immersion exposure, a gap between an exposure lens and a wafer in an exposure apparatus is filled with a fluid such as water to change refractive index in the gap, such that an apparent wavelength of the light from the exposure light source is shortened. In a case where immersion exposure is performed using an ArF excimer laser apparatus as an exposure light source, a wafer is irradiated with ultraviolet light whose wavelength in water is equivalent to 134 nm. This technology is referred to as "ArF immersion exposure". The ArF immersion exposure is also referred to as "ArF immersion lithography".

Spectrum line widths of KrF and ArF excimer laser apparatuses in natural oscillation are as wide as approximately 350 pm to 400 pm. This causes a chromatic aberration of a laser beam (ultraviolet light) that is subjected to reduced projection onto a wafer by a projection lens in an exposure apparatus. The chromatic aberration thus causes a reduction in resolving power. Therefore, a spectrum line width of a laser beam that is outputted from a gas laser apparatus needs to be narrowed to such an extent that the chromatic aberration can be ignored. The spectrum line width is also referred to as "spectrum width". To narrow the spectrum width, a laser resonator of a gas laser apparatus is equipped with a line narrow module having a line narrow element. The line narrow element may be an etalon, a grating, or the like. A laser apparatus whose spectrum width is narrowed in this way is referred to as "line narrowed laser apparatus".

Patent Document 1: U.S. Pat. No. 7,643,522 B
Patent Document 2: Japanese Patent Application Publication No. 2008-098282 A
Patent Document 3: U.S. Pat. No. 6,870,865 B
Patent Document 4: Japanese Patent Application Publication No. 2003-051633 A

SUMMARY

An aspect of the present disclosure may be related to a line narrowed laser apparatus configured to perform a plurality of burst oscillations including a first burst oscillation and a second burst oscillation next to the first burst oscillation to output a pulse laser beam. The line narrowed laser apparatus comprises a laser resonator, a chamber provided in the laser resonator, a pair of electrodes provided in the chamber, an electric power source configured to apply a pulsed voltage to the pair of electrodes, a wavelength-selecting element provided in the laser resonator, a spectral width varying unit provided in the laser resonator, a wavelength variable unit configured to change a selected wavelength selected by the wavelength-selecting element, and a controller. The controller is configured to control the wavelength variable unit based on an amount of control of the spectral width varying unit in a period from a time of ending the first burst oscillation to a time of starting the second burst oscillation.

BRIEF DESCRIPTION OF DRAWINGS

Exemplary embodiments of the present disclosure will be described below as mere examples with reference to the appended drawings.

FIG. 8 is a flowchart showing a subroutine of a process of S80 shown in FIG. 6.

FIG. 9 is a flowchart showing a subroutine of a process of S60 shown in FIG. 6.

FIG. 10 shows a structure of a data table showing a relation of the amount of change $\Delta E95$ in the spectral width to the length of the suspension period Tr.

FIG. 17 is a flowchart showing a first example of a subroutine of S300 shown in FIG. 16.

FIG. 18 is a flowchart showing a first example of a subroutine of S900 shown in FIG. 16.

FIG. 19 shows a structure of a data table showing a relation of an amount of change $\Delta\lambda$ in the wavelength to an amount of feedforward control $\Delta E95s$ of the spectral width.

FIG. 20 is a flowchart showing a second example of the subroutine of S300 shown in FIG. 16.

FIG. 21 is a flowchart showing a second example of the subroutine of S900 shown in FIG. 16.

FIG. 22 is a graph showing an example of the relation of the amount of change $\Delta\lambda$ in the wavelength to the amount of feedforward control $\Delta E95s$ of the spectral width.

DESCRIPTION OF EMBODIMENTS

Contents
1. Line Narrowed Laser Apparatus According to Comparative Example
    1.1 Laser Chamber
    1.2 Line Narrow Module
    1.3 Spectral Width Varying Unit
    1.4 Energy Sensor
    1.5 Etalon Spectroscope
    1.6 Controller
    1.7 Control of Spectral Width
    1.8 Control of Wavelength
    1.9 Problem
2. Line Narrowed Laser Apparatus That Controls Wavelength Based on Amount of Feedforward Control of Spectral Width (First Embodiment)
    2.1 Configuration
    2.2 Operation
    2.2.1 First Example
    2.2.2 Second Example
    2.3 Details of Spectral Width Varying Unit
3. Line Narrowed Laser Apparatus That Updates Data by Adjusting Oscillation (Second Embodiment)
    3.1 Configuration
    3.2 Operation
    3.2.1 Main Flow
    3.2.2 Details of Adjusting Oscillation
4. Line Narrowed Laser Apparatus That Performs Feedforward Control of Wavelength According to Thermal Load (Third Embodiment)
    4.1 Configuration
    4.2 Operation
5. Details of Spectral Width Varying Unit
6. Configuration of Controller Embodiments of the present disclosure will be described in detail below with reference to the drawings. The embodiments described below indicate several examples of the present disclosure, and may not intend to limit the content of the present disclosure. Not all of the configurations and operations described in the embodiments are indispensable in the present disclosure.

Identical reference symbols may be assigned to identical constituent elements and redundant descriptions thereof may be omitted.

1. Line Narrowed Laser Apparatus According to Comparative Example

Figure 1:
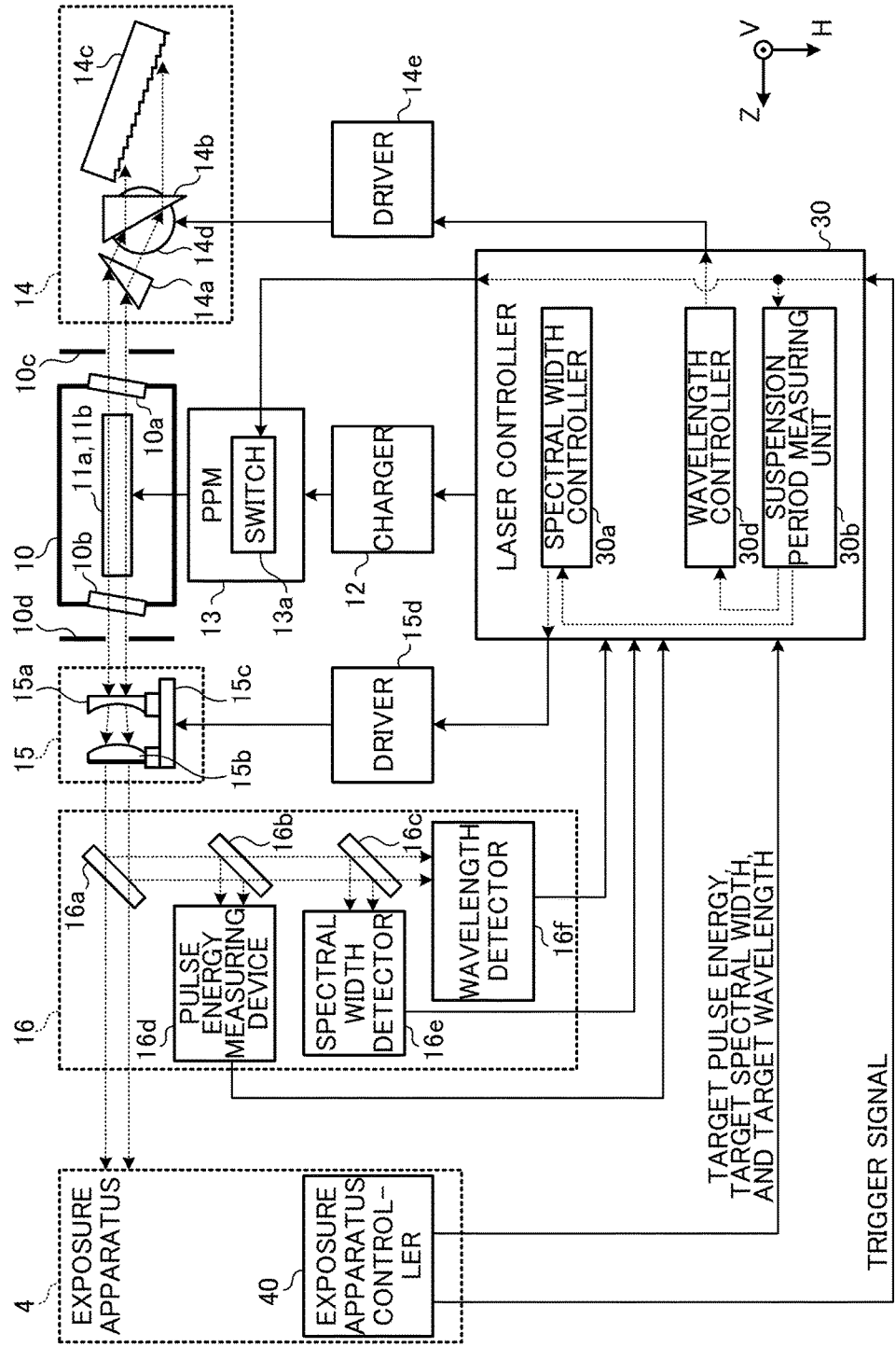
FIG. 1 schematically shows a configuration of a line narrowed laser apparatus according to a comparative example.

FIG. 1 schematically shows a configuration of a line narrowed laser apparatus according to a comparative example. The line narrowed laser apparatus shown in FIG. 1 may include a laser chamber 10, a pair of discharge electrodes 11a and 11b, a charger 12, a pulse power module (PPM) 13, a line narrow module 14, and a spectral width varying unit 15. The line narrowed laser apparatus may further include a sensor unit 16 and a laser controller 30.

The line narrowed laser apparatus may be an excimer laser apparatus that outputs a pulse laser beam to enter an exposure apparatus 4 or other apparatus.

FIG. 1 shows the line narrowed laser apparatus as viewed in a direction substantially parallel to a direction of electric discharge between the pair of discharge electrodes 11a and 11b. The discharge electrode 11b may be in a position hidden by the discharge electrode 11a in FIG. 1. The traveling direction of the pulse laser beam outputted from the line narrowed laser apparatus may be a Z direction. The direction of electric discharge between the pair of discharge electrodes 11a and 11b may be a V direction or a −V direction. The direction perpendicular to the Z and V directions may be an H direction.

1.1 Laser Chamber

The laser chamber 10 may be a chamber that contains laser gas including, for example, a rare gas such as argon gas or krypton gas, a halogen gas such as fluorine gas or chlorine gas, and a buffer gas such as neon gas or helium gas. Respective ends of the laser chamber 10 may be equipped with windows 10a and 10b.

The pair of discharge electrodes 11a and 11b may be provided in the laser chamber 10 to excite the laser medium by electric discharge. The pulse power module 13 may be connected to the charger 12. The pulse power module 13 may include an unillustrated charging capacitor and a switch 13a. An output of the charger 12 may be connected to the charging capacitor. The charging capacitor may hold electric energy for applying a high voltage to the pair of discharge electrodes 11a and 11b. The laser controller 30 may input a trigger signal to the switch 13a to turn ON the switch 13a. The pulse power module 13 may then generate a pulsed high voltage from the electric energy held by the charger 12. The pulsed high voltage may be applied to the pair of discharge electrodes 11a and 11b.

The high voltage applied to the pair of discharge electrodes 11a and 11b may cause electric discharge to be generated between the pair of discharge electrodes 11a and 11b. The energy of the electric discharge may excite the laser medium in the laser chamber 10 to cause the laser medium to shift to a high energy level. The excited laser medium may then shift back to a low energy level to generate light depending on the difference between the energy levels.

As shown in FIG. 1, the windows 10a and 10b may be provided such that the plane of incidence of the light incident on each window substantially coincides with the HZ plane, and the angle of incidence of the light substantially matches a Brewster's angle. The light generated in the laser chamber 10 may be emitted via the windows 10a and 10b to the exterior of the laser chamber 10.

1.2 Line Narrow Module

The line narrow module 14 may include two prisms 14a and 14b and a grating 14c. The prisms 14a and 14b and the grating 14c may each be held by an unillustrated holder. The line narrow module 14 may constitute a wavelength-selecting element of the present disclosure.

The prisms 14a and 14b may expand the beam width in the H direction of the light emitted via the window 10a of the laser chamber 10 to allow the light to be incident on the grating 14c. Also, the prisms 14a and 14b may reduce the beam width in the H direction of reflected light from the grating 14c to allow the light to return to an electric discharge space in the laser chamber 10 via the window 10a.

The grating 14c may have a high reflective material on its surface with multiple grooves at prescribed intervals. Each of the grooves may be, for example, a right triangular groove. The light incident on the grating 14c from the prisms 14a and 14b may be reflected by these grooves while being diffracted to directions according to wavelengths of the light. The grating 14c may be in a Littrow arrangement such that an angle of incidence of the light incident on the grating 14c from the prisms 14a and 14b and an angle of diffraction of the diffracted light having a desired wavelength are substantially equal to each other. The light having a wavelength around the desired wavelength may thus return to the laser chamber 10 via the prisms 14a and 14b. The prism 14b may be adjusted its posture by a rotary stage 14d having a rotating shaft parallel to the V direction. The rotary stage 14d may be driven by a driver 14e. Adjusting the posture of the prism 14b may allow the angle of incidence of the light incident on the grating 14c from the prism 14b to be changed. The wavelength of the light selected by the line narrow module 14 may thus be changed. The rotary stage 14d may constitute a wavelength variable unit in the present disclosure.

1.3 Spectral Width Varying Unit

The spectral width varying unit 15 may be a wavefront variable unit to adjust the wavefront of the laser beam in the laser resonator. The spectral width varying unit 15 may include a plano-concave cylindrical lens 15a and a plano-convex cylindrical lens 15b. Distance to the laser chamber 10 from the plano-concave cylindrical lens 15a may be smaller than that from the plano-convex cylindrical lens 15b. These lenses may be arranged such that the concave surface of the plano-concave cylindrical lens 15a and the convex surface of the plano-convex cylindrical lens 15b face each other. The plano-concave cylindrical lens 15a may be movable in the Z direction and the −Z direction with a linear stage 15c. The linear stage 15c may be driven by a driver 15d. The linear stage 15c may constitute a moving mechanism in the present disclosure. The plane surface of the plano-convex cylindrical lens 15b may be coated with a partially reflective film. The spectral width varying unit 15 including the plano-convex cylindrical lens 15b may thus transmit and output a part of the light outputted from the window 10b of the laser chamber 10, and reflect another part to return it to the laser chamber 10.

Moving the plano-concave cylindrical lens 15a in the Z direction or the −Z direction may allow wavefront of the light incident on the spectral width varying unit 15 from the laser chamber 10 and returned to the laser chamber 10 to be adjusted in the direction of dispersion of the grating 14c. Adjusting the wavefront may cause the wavefront of the laser beam incident on the grating 14c to be changed. This may allow the spectral width of the light selected by the line narrow module 14 to be changed.

A slit plate 10c to limit the beam width of the light may be provided between the laser chamber 10 and the line narrow module 14. Another slit plate 10d to limit the beam width of the light may be provided between the laser chamber 10 and the spectral width varying unit 15.

The line narrow module 14 and the spectral width varying unit 15 may constitute a laser resonator. The light emitted from the laser chamber 10 may reciprocate between the line narrow module 14 and the spectral width varying unit 15. The light may thus be amplified each time it passes through the electric discharge space between the discharge electrodes 11a and 11b to cause laser oscillation. The spectral width of the laser beam may be narrowed each time the beam is returned by the line narrow module 14. Further, a polarized light component polarized in the H direction may be selected by the arrangement of the windows 10a and 10b described above. The laser beam thus being amplified may be outputted from the spectral width varying unit 15 to the exposure apparatus 4.

1.4 Energy Sensor

The sensor unit 16 may be provided in an optical path of the pulse laser beam between the spectral width varying unit 15 and the exposure apparatus 4. The sensor unit 16 may include beam splitters 16a, 16b, and 16c, a pulse energy measuring device 16d, a spectral width detector 16e, and a wavelength detector 16f. The beam splitter 16a may transmit the pulse laser beam outputted from the spectral width varying unit 15 at a high transmittance and reflect a part of the pulse laser beam outputted from the spectral width varying unit 15. The beam splitter 16b may be provided in an optical path of the pulse laser beam reflected by the beam splitter 16a. The beam splitter 16b may transmit a part of the pulse laser beam reflected by the beam splitter 16a, and reflect another part of the pulse laser beam reflected by the beam splitter 16a. The beam splitter 16o may be provided in an optical path of the pulse laser beam transmitted by the beam splitter 16b. The beam splitter 16c may transmit a part of the pulse laser beam transmitted by the beam splitter 16b and reflect another part of the pulse laser beam transmitted by the beam splitter 16b.

The pulse energy measuring device 16d may be provided in an optical path of the pulse laser beam reflected by the beam splitter 16b. The pulse energy measuring device 16d may detect the pulse energy of the pulse laser beam reflected by the beam splitter 11b. The pulse energy measuring device 16d may output data on the detected pulse energy to the laser controller 30. The pulse energy measuring device 16d may be constituted by a photo-diode, a photoelectric tube, or a pyroelectric element.

The spectral width detector 16e may be provided in an optical path of the pulse laser beam reflected by the beam splitter 16c. The spectral width detector 16e may detect the spectral width of the pulse laser beam reflected by the beam splitter 16c. The spectral width detector 16e may output data on the detected spectral width to the laser controller 30. The spectral width detector 16e may include an etalon spectroscope. A specific configuration of the etalon spectroscope will be described below with reference to FIG. 2.

The wavelength detector 16f may be provided in an optical path of the pulse laser beam transmitted by the beam splitter 16c. The wavelength detector 16f may detect the wavelength of the pulse laser beam transmitted by the beam splitter 16c. The wavelength detected by the wavelength detector 16f may be the peak wavelength, the centroid wavelength, or the average value of the wavelengths at half maximum. The wavelength detector 16f may output data on the detected wavelength to the laser controller 30.

The wavelength detector 16f may include another etalon spectroscope.

1.5 Etalon Spectroscope

Figure 2:
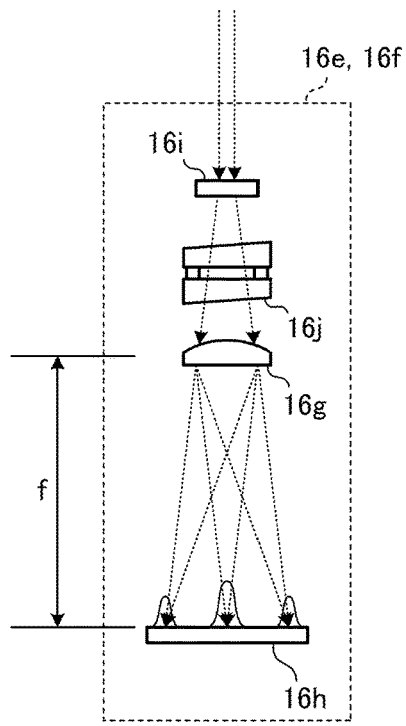
FIG. 2 shows an example of a specific configuration of an etalon spectroscope included in each of a spectral width detector 16e and a wavelength detector 16f shown in FIG. 1.

FIG. 2 shows an example of a specific configuration of the etalon spectroscope included in each of the spectral width detector 16e and the wavelength detector 16f shown in FIG. 1. The etalon spectroscope may include a diffusing plate 16i, an etalon 16j, a light condensing lens 16g, and a line sensor 16h.

The diffusing plate 16i may be a transmissive optical element with multiple projections and depressions on its surface. The pulse laser beam entered the diffusing plate 16i may be emitted from the diffusing plate 16i as scattered light. The scattered light emitted from the diffusing plate 16i may be incident on the etalon 16j.

The etalon 16j may be an air gap etalon including two partially reflective mirrors each having a predetermined reflectance R. In the air gap etalon, the two partially reflective mirrors may face each other with an air gap d being a predetermined distance and be fixed to each other with a spacer between them.

A part of the light directly transmitted by the etalon 16j without reciprocating between the two partially reflective mirrors and another part of the light transmitted by the etalon 16j after reciprocating once between the two partially reflective mirrors may be different in optical path length. The difference in the optical path length may be different according to angles of incidence θ of the parts of the light incident on the etalon 16j. If the difference in the optical path length is m times as long as the wavelength λ of the light incident on the etalon 16j, where m is an integer, a part of the light directly transmitted by the etalon 16j without reciprocating between the two partially reflective mirrors and multiple parts of the light transmitted by the etalon 16j after reciprocating once, twice, . . . , and k times between the two partially reflective mirrors may interfere with each other. Such interference may allow the light having the wavelength λ to be transmitted by the etalon 16j at high transmittance.

A basic formula of an etalon is shown below.

$$m\lambda = 2nd \cos \theta \qquad \text{Formula 1}$$

Here, n represents refractive index of the air gap.

The light having the wavelength λ and being incident on the etalon 16j at the angle of incidence θ that satisfies Formula 1 may pass through the etalon 16j at high transmittance.

The angle of incidence θ of light transmitted by the etalon 16j at high transmittance may thus be different according to the wavelength of the light incident on the etalon 16j. The light transmitted by the etalon 16j may enter the light condensing lens 16g.

The light condensing lens 16g may be a condensing optical element. The light transmitted by the light condensing lens 16g may be incident on the line sensor 16h provided at the focal length f of the light condensing lens 16g from the light condensing lens 16g. The light transmitted by the light condensing lens 16g may form interference fringes at the line sensor 16h.

Based on Formula 1 described above, use of a half-angle formula and approximation using $\sin \theta \approx \theta$ may derive that a square of a radius of an interference fringe may be in proportion to a wavelength λ of the pulse laser beam.

The line sensor 16h may receive the light transmitted by the light condensing lens 16g to detect the interference fringes. The interference fringes may allow an unillustrated arithmetic circuit in each of the spectral width detector 16e and the wavelength detector 16f to detect wavelength components in the pulse laser beam and calculate the spectral width or the central wavelength. Data on the spectral width or the central wavelength may be outputted to the laser controller 30. Alternatively, the laser controller 30 may have some or all of the functions of the arithmetic circuit described above. Further, the line sensor 16h may be substituted by an unillustrated 1-dimensional or 2-dimensional image sensor.

Figure 3:
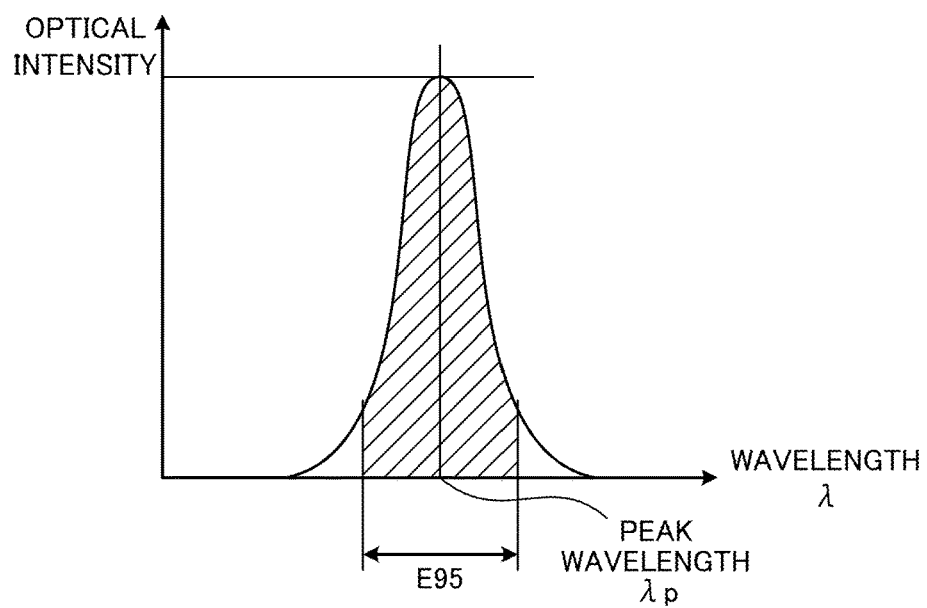
FIG. 3 explains an example of a definition of spectral width.

FIG. 3 explains an example of a definition of the spectral width. FIG. 3 shows a spectral shape of a pulse laser beam. As shown in FIG. 3, the full width of the range that covers 95% of the entire energy of the pulse laser beam with the peak wavelength $\lambda_p$ being at a center is referred to as "spectral width E95" in this specification. The spectral width E95 may also be referred to as "spectral purity". The spectral width E95 corresponds to Δλ in the formula shown below. In the formula, $g(\lambda+\lambda_p)$ represents energy at a wavelength $(\lambda+\lambda_p)$ in the spectral shape.

$$\frac{\int_{-\frac{\Delta\lambda}{2}}^{\frac{\Delta\lambda}{2}} g(\lambda + \lambda_0) d\lambda}{\int_{-\infty}^{\infty} g(\lambda + \lambda_0) d\lambda} = 0.95$$

1.6 Controller

With reference back to FIG. 1, the exposure apparatus 4 may include an exposure apparatus controller 40. The exposure apparatus controller 40 may perform control such as moving an unillustrated wafer stage. The exposure apparatus controller 40 may output data on target pulse energy, data on target spectral width, data on target wavelength, and a trigger signal to the laser controller 30.

The laser controller 30 may set a charging voltage of the charger 12 based on the data on the pulse energy received from the pulse energy measuring device 16d and the data on the target pulse energy received from the exposure apparatus controller 40. The pulse energy of the pulse laser beam outputted from the line narrowed laser apparatus thus may be controlled to approach the target pulse energy.

The laser controller 30 may include a spectral width controller 30a. The spectral width controller 30a may be configured as a program module loaded on a memory 1002 described below included in the laser controller 30.

The spectral width controller 30a may control the spectral width varying unit 15 via the driver 15d based on the data on the spectral width received from the spectral width detector 16e and the data on the target spectral width received from the exposure apparatus controller 40. Thus, the spectral width of the pulse laser beam outputted from the line narrowed laser apparatus may be controlled to approach the target spectral width.

The laser controller 30 may include a wavelength controller 30d. The wavelength controller 30d may be configured as a program module loaded on the memory 1002 described below included in the laser controller 30.

The wavelength controller 30d may control the rotary stage 14d via the driver 14e based on the data on the wavelength received from the wavelength detector 16f and the data on the target wavelength received from the exposure apparatus controller 40. Thus, the wavelength of the pulse laser beam outputted from the line narrowed laser apparatus may be controlled to approach the target wavelength.

The laser controller 30 may further include a suspension period measuring unit 30b. The suspension period measuring unit 30b may be configured as a program module loaded on the memory 1002 described below included in the laser controller 30.

The laser controller 30 may output the trigger signal received from the exposure apparatus controller 40 to the switch 13a in the pulse power module 13. The trigger signal received from the exposure apparatus controller 40 may further be inputted to the suspension period measuring unit 30b. The suspension period measuring unit 30b may measure a length of a suspension period of the line narrowed laser apparatus based on the trigger signal. The suspension period may be a period from receiving a pulse of the trigger signal until receiving the next pulse of the trigger signal.

1.7 Control of Spectral Width

Figure 4:
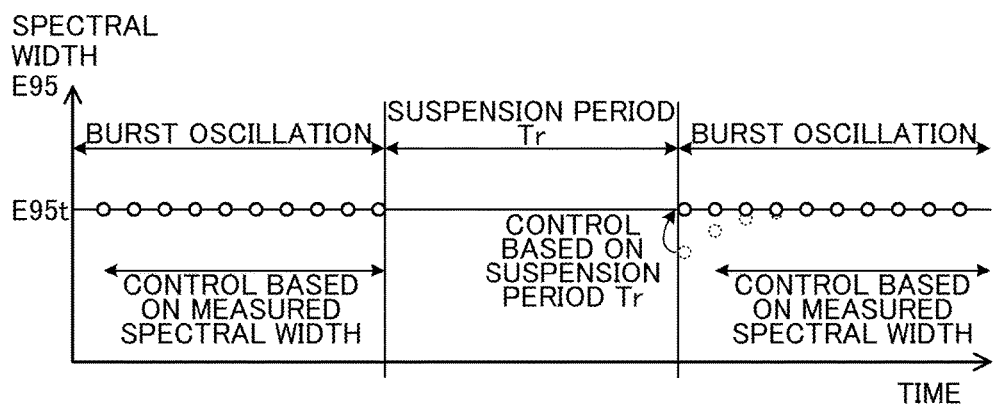
FIG. 4 explains an example of control of the spectral width performed by a spectral width controller 30a shown in FIG. 1.

FIG. 4 explains an example of control of the spectral width performed by the spectral width controller 30a shown in FIG. 1. Each of the small circles in FIG. 4 corresponds to an individual pulse of the pulse laser beam generated based on the trigger signal. The line narrowed laser apparatus may alternately repeat performing a burst oscillation, outputting the pulse laser beam with a repetition frequency equal to or higher than a predetermined threshold value, and suspending the burst oscillation. The burst oscillation may be performed, for example, during an exposure of an individual chip region of a semiconductor wafer in the exposure apparatus 4. The burst oscillation may be suspended, for example, to move an unillustrated wafer stage after ending an exposure of a first chip region and before starting an exposure of a second chip region, or to exchange a semiconductor wafer mounted on the wafer stage.

During the burst oscillation, a feedback control of the spectral width varying unit 15 may be performed based on the data on the spectral width measured by the spectral width detector 16e described above and the data on the target spectral width received from the exposure apparatus controller 40.

During the suspension period suspending the burst oscillation, the data on the spectral width may not be available from the spectral width detector 16e. If a setting value for the spectral width varying unit 15 is not changed after ending the previous burst oscillation and before starting the next burst oscillation, the spectral width may be narrowed at the time of starting the next burst oscillation. Small circles drawn with broken lines in FIG. 4 represent the narrowed spectral width in the case where the setting value of the spectral width varying unit 15 is kept unchanged in the suspension period suspending the burst oscillation. The narrowed spectral width may cause a change in focusing performance in the exposure apparatus 4, which may affect the quality of exposure.

The narrowed spectral width during the suspension period suspending the burst oscillation may be caused by a change in temperature of optical elements during the suspension period suspending the burst oscillation to change characteristics of the optical elements. Amount of change $\Delta E95$ in the spectral width showing an amount of narrowing the spectral width may be different according to the length of the suspension period Tr suspending the burst oscillation.

Figure 5:
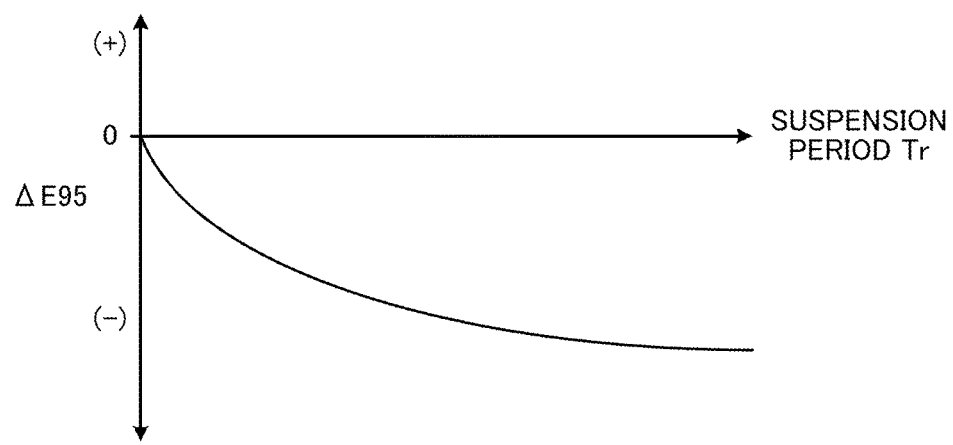
FIG. 5 is a graph showing an example of a relation of an amount of change $\Delta E95$ in the spectral width to a length of a suspension period Tr.

FIG. 5 is a graph showing an example of a relation of the amount of change $\Delta E95$ in the spectral width to the length of the suspension period Tr. The relation of the amount of change $\Delta E95$ in the spectral width to the length of the suspension period Tr may be similar to a damping function with a first order lag.

Accordingly, the spectral width controller 30a may control the spectral width varying unit 15 after ending the previous burst oscillation and before starting the next burst oscillation. This control may compensate for the amount of narrowing the spectral width according to the length of the suspension period suspending the burst oscillation. As shown by the small circles drawn with solid lines in FIG. 4, the pulse laser beam at a spectral width around the target spectral width E95t may thus be outputted from the time of starting the next burst oscillation. The control of the spectral width varying unit 15 in the suspension period suspending the burst oscillation may be referred to as a feedforward control of the spectral width in the following description.

Figure 6:
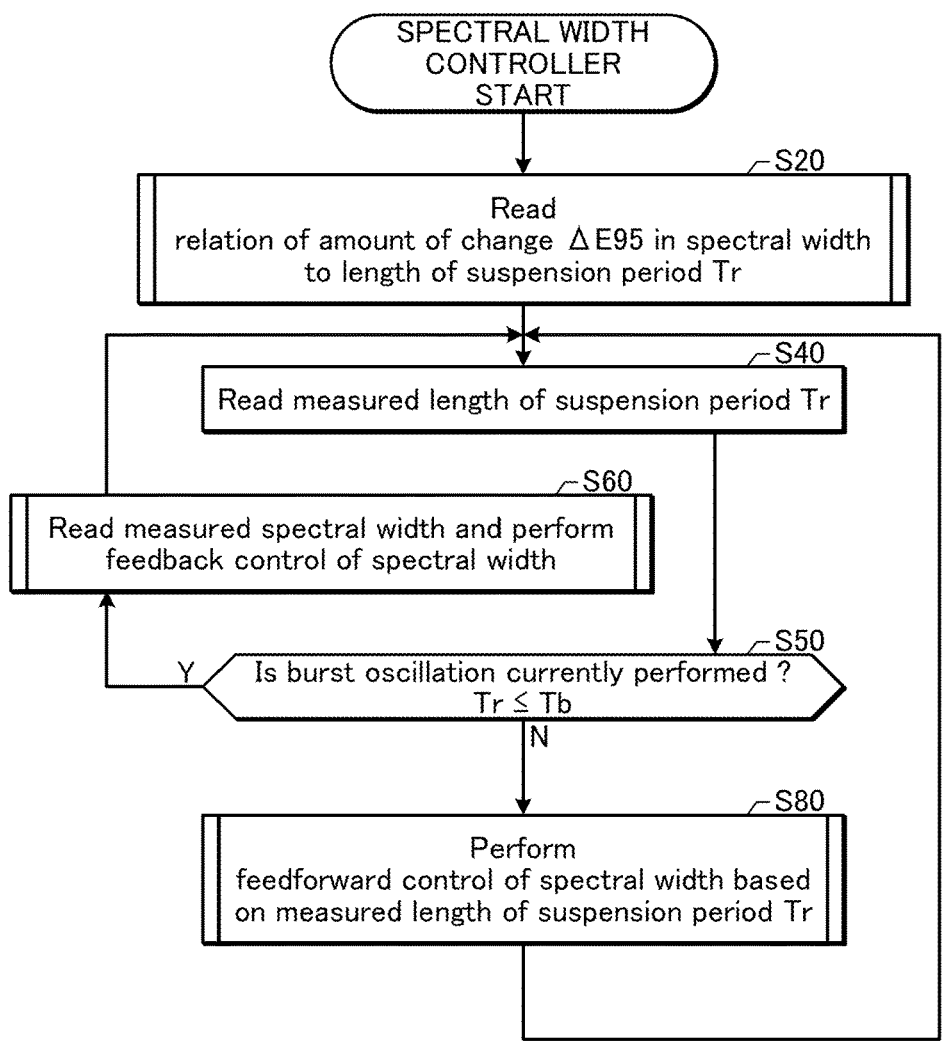
FIG. 6 is a flowchart showing a process of control of the spectral width performed by the spectral width controller 30a shown in FIG. 1.
Figure 7:
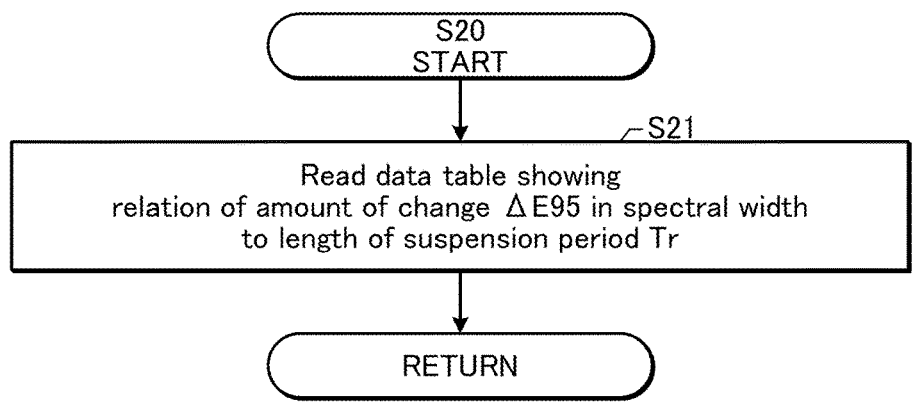
FIG. 7 is a flowchart showing a subroutine of a process of S20 shown in FIG. 6.

FIG. 6 is a flowchart showing a process of control of the spectral width performed by the spectral width controller 30a shown in FIG. 1. FIGS. 7 to 9 are flowcharts each showing a subroutine of a process of a part of the flowchart shown in FIG. 6. The spectral width controller 30a may perform control in the suspension period suspending the burst oscillation (S80) and control in the period of burst oscillation (S60) as follows.

Firstly, at S20 in FIG. 6, the spectral width controller 30a may read data showing the relation of the amount of change $\Delta E95$ in the spectral width to the length of the suspension period Tr from an unillustrated storage device. The relation of the amount of change $\Delta E95$ in the spectral width to the length of the suspension period Tr may be similar to the damping function with a first order lag described above with reference to FIG. 5.

With reference to FIG. 7 showing the subroutine of S20, the spectral width controller 30a may read, at S21, a data table showing the relation of the amount of change $\Delta E95$ in the spectral width to the length of the suspension period Tr.

FIG. 10 shows a structure of the data table showing the relation of the amount of change $\Delta E95$ in the spectral width to the length of the suspension period Tr. In the data table shown in FIG. 10, the amount of change $\Delta E95$ in the spectral width may correspond one by one to the length of the suspension period Tr.

With reference back to FIG. 6, at S40 next to S20, the spectral width controller 30a may read the length of the suspension period Tr measured by the suspension period measuring unit 30b. As described above, the length of the suspension period Tr may be a length of a period from receiving a pulse of the trigger signal until receiving the next pulse of the trigger signal.

Next, at S50, the spectral width controller 30a may determine whether the burst oscillation is currently performed based on the measured length of the suspension period Tr. For example, if the length of the suspension period Tr is equal to or less than a predetermined threshold value Tb, the spectral width controller 30a may determine that the burst oscillation is currently performed (S50: YES) and proceed to S60. The predetermined threshold value Tb may be 0.01 seconds or more, 0.05 seconds or less. The predetermined threshold value Tb may be, for example, around 0.02 seconds. Namely, if the trigger signal is inputted at a repetition frequency of 50 Hz or more, the spectral width controller 30a may determine that the burst oscillation is currently performed.

If the length of the suspension period Tr is more than the predetermined threshold value Tb, the spectral width controller 30a may determine that the burst oscillation is not currently performed but suspended (S50: NO) and proceed to S80.

At S80, the spectral width controller 30a may control the spectral width varying unit 15 based on the measured length of the suspension period Tr. Namely, the spectral width controller 30a may perform feedforward control of the spectral width.

After S80, the spectral width controller 30a may return to S40 described above and repeat the subsequent process. If the suspension period Tr continues further, the spectral width controller 30a may further perform S80 to control the spectral width varying unit 15 at every measurement of a new value of the length of the suspension period Tr.

With reference to FIG. 8 showing the subroutine of S80, the spectral width controller 30a may firstly read, at S81, the amount of change ΔE95 in the spectral width corresponding to the measured length of the suspension period Tr from the data table. The spectral width controller 30a may then control, at S83, the spectral width varying unit 15 to compensate for the amount of change ΔE95 in the spectral width. If the relation of the amount of change ΔE95 in the spectral width to the length of the suspension period Tr is similar to the damping function with a first order lag described above with reference to FIG. 5, compensating for the amount of change ΔE95 in the spectral width may include expanding the spectral width. Namely, the spectral width varying unit 15 may be controlled to adjust the spectral width to a value larger than the spectral width, where the spectral width varying unit 15 is not controlled after ending the previous burst oscillation, by the absolute value |ΔE95| of ΔE95. The amount of control of the spectral width varying unit 15 in the feedforward control of the spectral width may be defined as an amount of feedforward control ΔE95s of the spectral width.

With reference back to FIG. 6, at S60, the spectral width controller 30a may control the spectral width varying unit 15 based on the measured spectral width. Namely, the spectral width controller 30a may perform feedback control of the spectral width.

After S60, the spectral width controller 30a may return to S40 described above and repeat the subsequent process. If the burst oscillation continues further, the spectral width controller 30a may further perform S60 to control the spectral width varying unit 15 at every measurement of a new value of the spectral width.

With reference to FIG. 9 showing the subroutine of S60, the spectral width controller 30a may firstly read, at S61, the measured spectral width E95. The spectral width controller 30a may then control, at S62, the spectral width varying unit 15 such that the difference between the measured spectral width E95 and the target value E95t of the spectral width approaches 0.

1.8 Control of Wavelength

Figure 11:
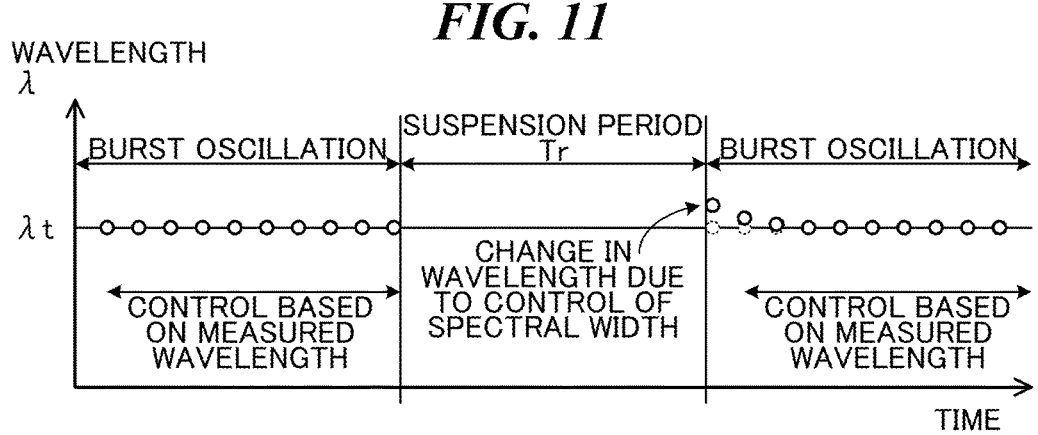
FIG. 11 explains an example of control of the wavelength performed by a laser controller 30 shown in FIG. 1.

FIG. 11 explains an example of control of the wavelength performed by the laser controller 30 shown in FIG. 1. Each of the small circles in FIG. 11 corresponds to an individual pulse of the pulse laser beam generated based on the trigger signal.

During the burst oscillation, the feedback control of the rotary stage 14d may be performed based on the data on the wavelength measured by the wavelength detector 16f described above and the data on the target wavelength received from the exposure apparatus controller 40.

During the suspension period suspending the burst oscillation, the data on the wavelength may not be available from the wavelength detector 16f. However, in the suspension period suspending the burst oscillation, the change in the characteristics of the optical elements of the line narrow module 14 may be smaller than that of the spectral width varying unit 15. The change in the wavelength in a case where the change in characteristics of the optical element of the line narrow module 14 in the suspension period suspending the burst oscillation is considered is shown by small circles drawn with broken lines in FIG. 11.

Figure 12:
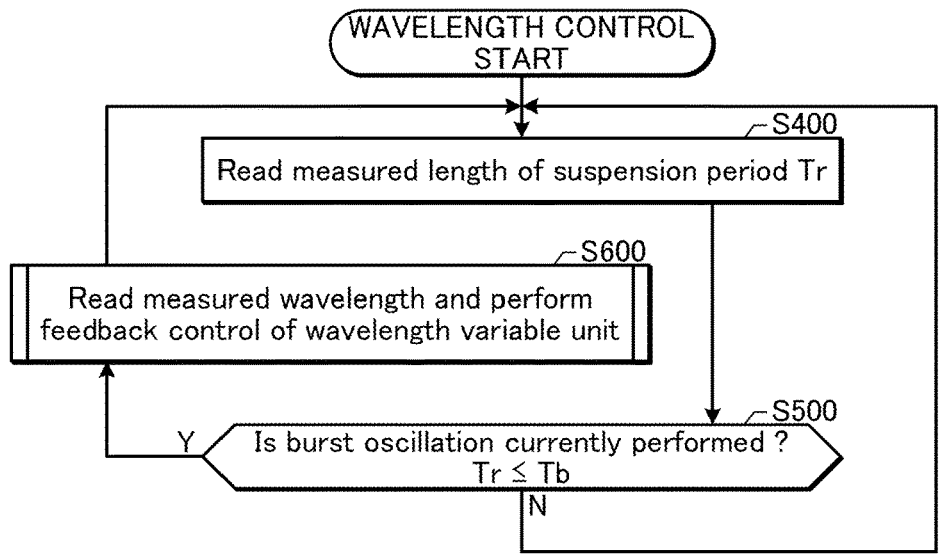
FIG. 12 is a flowchart showing a process of the control of the wavelength performed by the laser controller 30 shown in FIG. 1.
Figure 13:
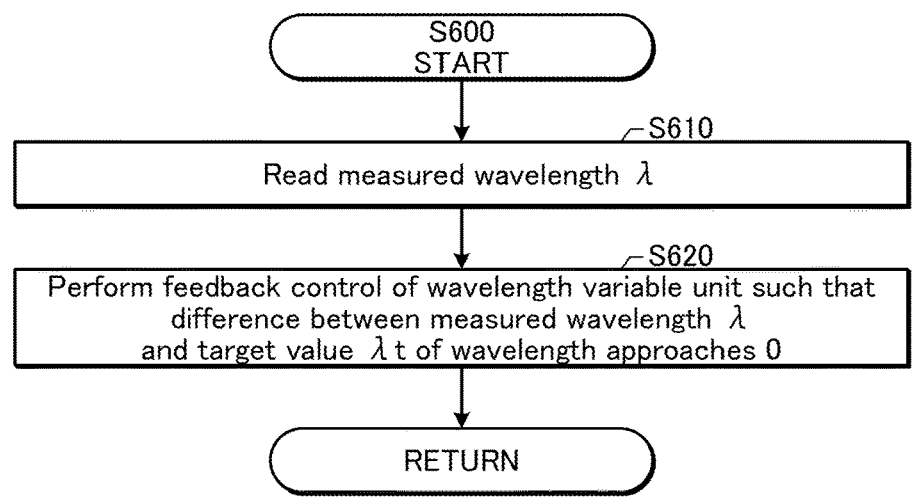
FIG. 13 is a flowchart showing a subroutine of S600 shown in FIG. 12.

FIG. 12 is a flowchart showing a process of the control of the wavelength performed by the laser controller 30 shown in FIG. 1. FIG. 13 is a flowchart showing a subroutine of S600 shown in FIG. 12. The process of the control of the wavelength shown in FIGS. 12 and 13 may be mainly performed by the wavelength controller 30d of the laser controller 30. The laser controller 30 may perform the feedback control (S600) of the wavelength as follows.

First, at S400 in FIG. 12, the laser controller 30 may read the length of the suspension period Tr measured by the suspension period measuring unit 30b. As described above, the length of the suspension period Tr may be a length of a period from receiving a pulse of the trigger signal until receiving the next pulse of the trigger signal.

Next, at S500, the laser controller 30 may determine whether the burst oscillation is currently performed based on the measured length of the suspension period Tr. For example, if the length of the suspension period Tr is equal to or less than a predetermined threshold value Tb, the laser controller 30 may determine that the burst oscillation is currently performed (S500: YES) and proceed to S600. The predetermined threshold value Tb may be 0.01 seconds or more, 0.05 seconds or less. The predetermined threshold value Tb may be, for example, around 0.02 seconds. Namely, if the trigger signal is inputted at a repetition frequency of 50 Hz or more, the laser controller 30 may determine that the burst oscillation is currently performed.

If the length of the suspension period Tr is more than the predetermined threshold value Tb, the laser controller 30 may determine that the burst oscillation is not currently performed but suspended (S500: NO). In the suspension period suspending the burst oscillation, the data on the wavelength may not be received from the wavelength detector 16f. The laser controller 30 may thus return to S400, without performing the control of the wavelength, and repeat the subsequent process.

At S600, the laser controller 30 may control the rotary stage 14d based on the measured wavelength. Namely, the laser controller 30 may perform feedback control of the wavelength.

After S600, the laser controller 30 may return to S400 described above and repeat the subsequent process. If the burst oscillation continues further, the laser controller 30 may further perform S600 to control the rotary stage 14d at every measurement of a new value of the wavelength.

With reference to FIG. 13 showing the subroutine of S600, the laser controller 30 may read, at S610, the measured wavelength $\lambda$. The laser controller 30 may then control, at S620, the rotary stage 14d such that the difference between the measured wavelength $\lambda$ and the target value $\lambda t$ of the wavelength approaches 0.

1.9 Problem

As described above, the change in characteristics of the optical elements of the line narrow module 14 may be small in the suspension period suspending the burst oscillation. However, performing the feedforward control of the spectral width described above with reference to FIGS. 4 to 10 may cause the wavelength of the pulse laser beam to be changed. The change in the wavelength of the pulse laser beam in the suspension period suspending the burst oscillation where the feedforward control of the spectral width is performed is shown by small circles drawn with solid lines in FIG. 11.

One reason for the change of the wavelength when the feedforward control of the spectral width is performed may be supposed to be a shift of the alignment of the plano-concave cylindrical lens 15a and the piano-convex cylindrical lens 15b relative to the laser resonator. The shift of the alignment may cause, as the plano-concave cylindrical lens 15a moves in the Z direction and the –Z direction, the plano-concave cylindrical lens 15a to shift in a direction other than the Z direction and the –Z direction. The shift of the plano-concave cylindrical lens 15a in the direction other than the Z direction and the –Z direction may cause the optical path axis of the light reciprocating in the laser resonator to be shifted. The angle of incidence of the light incident on the grating 14c may then be changed, causing the wavelength of the light selected by the line narrow module 14 to be changed. In the suspension period suspending the burst oscillation, the data on the wavelength may not be received from the wavelength detector 16f. Thus, at the time of starting the burst oscillation after the suspension period suspending the burst oscillation, the light having a wavelength different from the desired wavelength may be outputted.

In the embodiments described below, to solve the problem, the rotary stage 14d may be controlled in the suspension period suspending the burst oscillation. The control of the rotary stage 14d in the suspension period suspending the burst oscillation may be referred to as a feedforward control of the wavelength in the following description.

The feedforward control of the wavelength may be performed based on the amount of feedforward control $\Delta E95s$ of the spectral width described above.

2. Line Narrowed Laser Apparatus that Controls Wavelength Based on Amount of Feedforward Control of Spectral Width (First Embodiment)

2.1 Configuration

Figure 14:
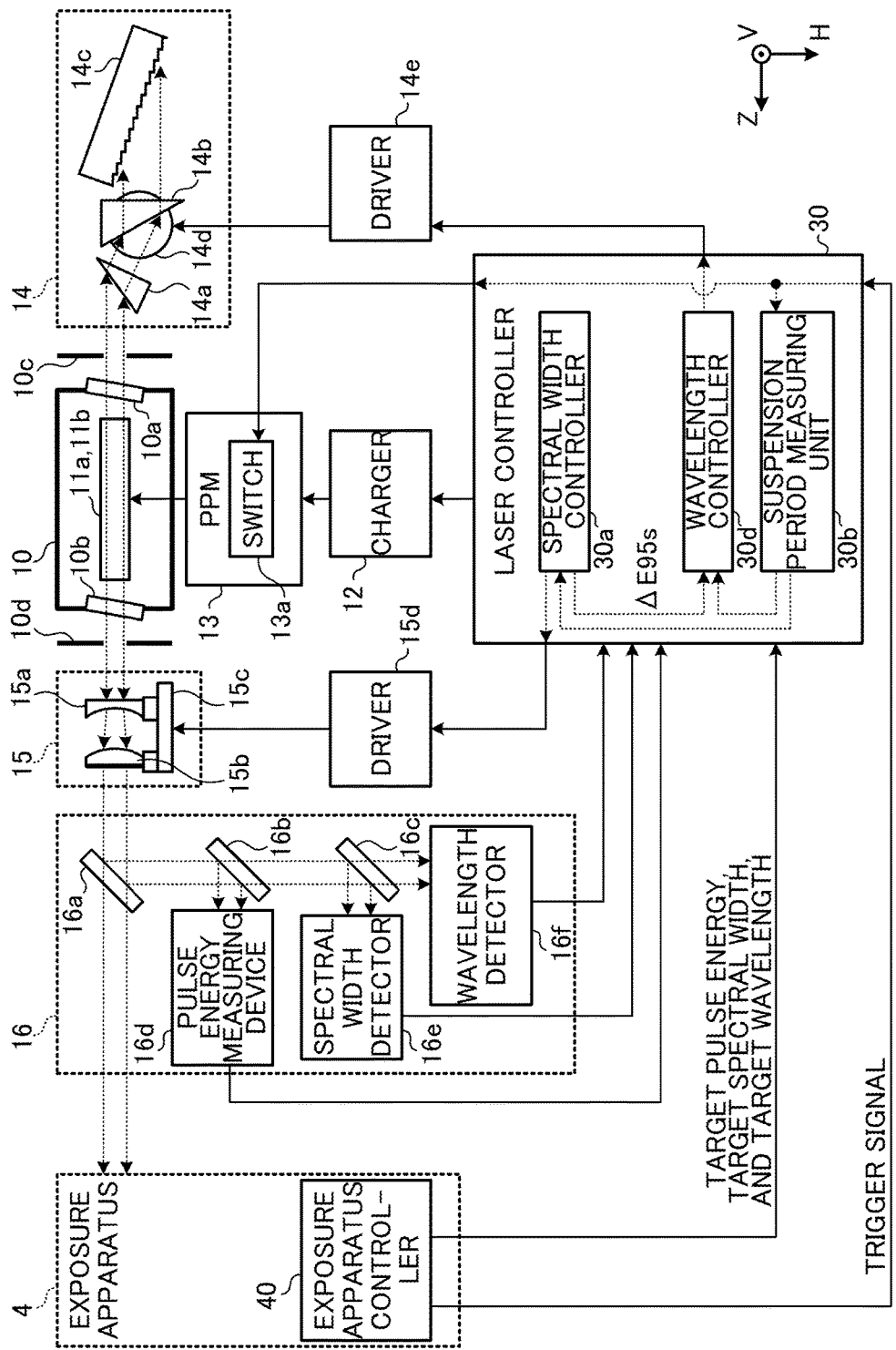
FIG. 14 schematically shows a configuration of a line narrowed laser apparatus according to a first embodiment of the present disclosure.

FIG. 14 schematically shows a configuration of the line narrowed laser apparatus according to a first embodiment of the present disclosure. In the laser controller 30 of the line narrowed laser apparatus according to the first embodiment, the spectral width controller 30a may send the data on the amount of feedforward control $\Delta E95s$ of the spectral width to the wavelength controller 30d. The amount of feedforward control $\Delta E95s$ of the spectral width may be determined, as described with reference to FIG. 4, according to the length of the suspension period suspending the burst oscillation. In the other aspects, the configuration of the first embodiment may be substantially the same as that of the comparative example described with reference to FIG. 1.

2.2 Operation

Figure 15:
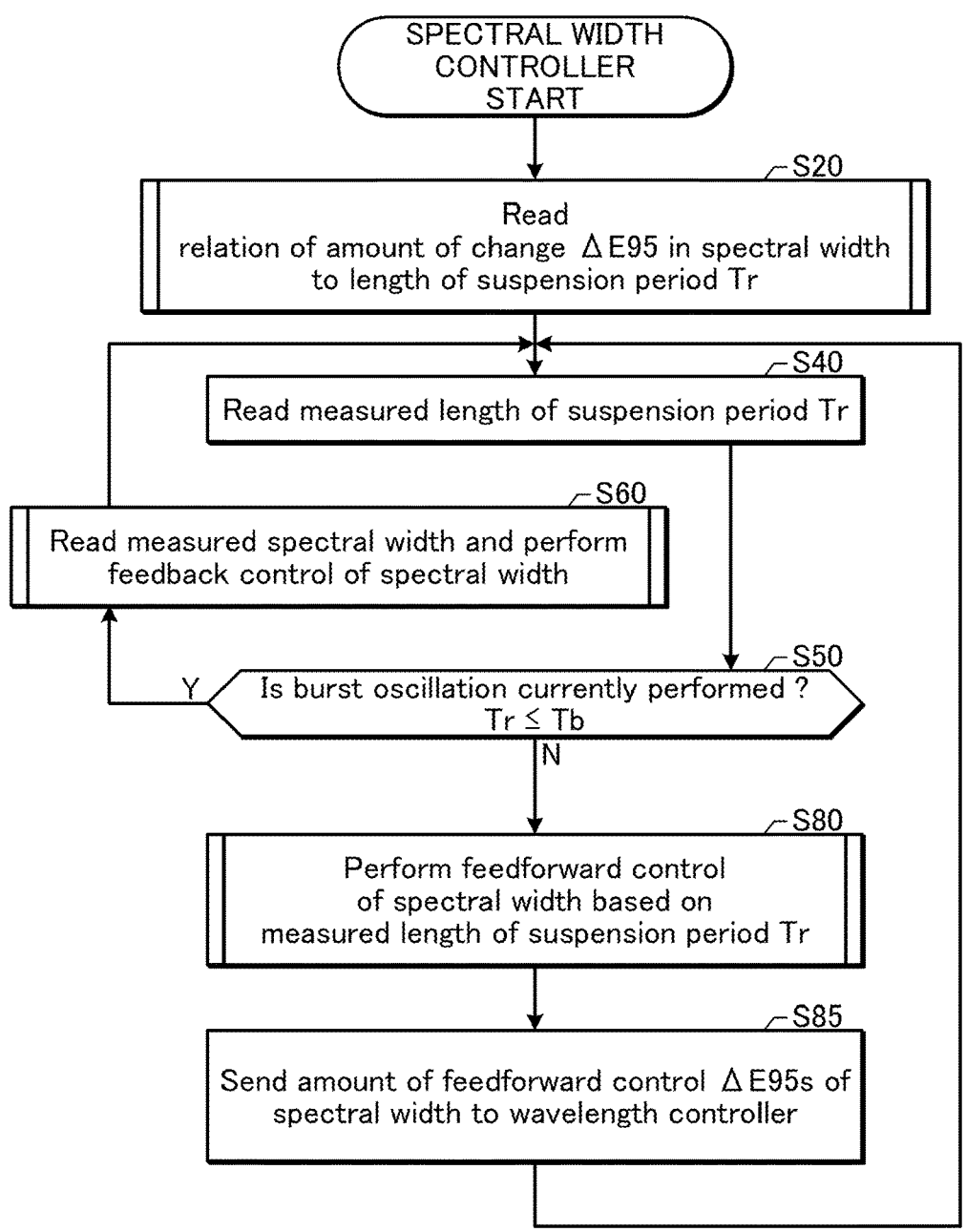
FIG. 15 is a flowchart showing a process of control of the spectral width performed by a spectral width controller 30a shown in FIG. 14.

FIG. 15 is a flowchart showing a process of the control of the spectral width performed by the spectral width controller 30a shown in FIG. 14. In FIG. 15, the process (S85) where the spectral width controller 30a sends the amount of feedforward control $\Delta E95s$ of the spectral width to the wavelength controller 30d may be added after S80 in FIG. 6. After S85, the spectral width controller 30a may return to S40. In the other aspects, the process in FIG. 15 may be substantially the same as that in FIG. 6.

Figure 16:
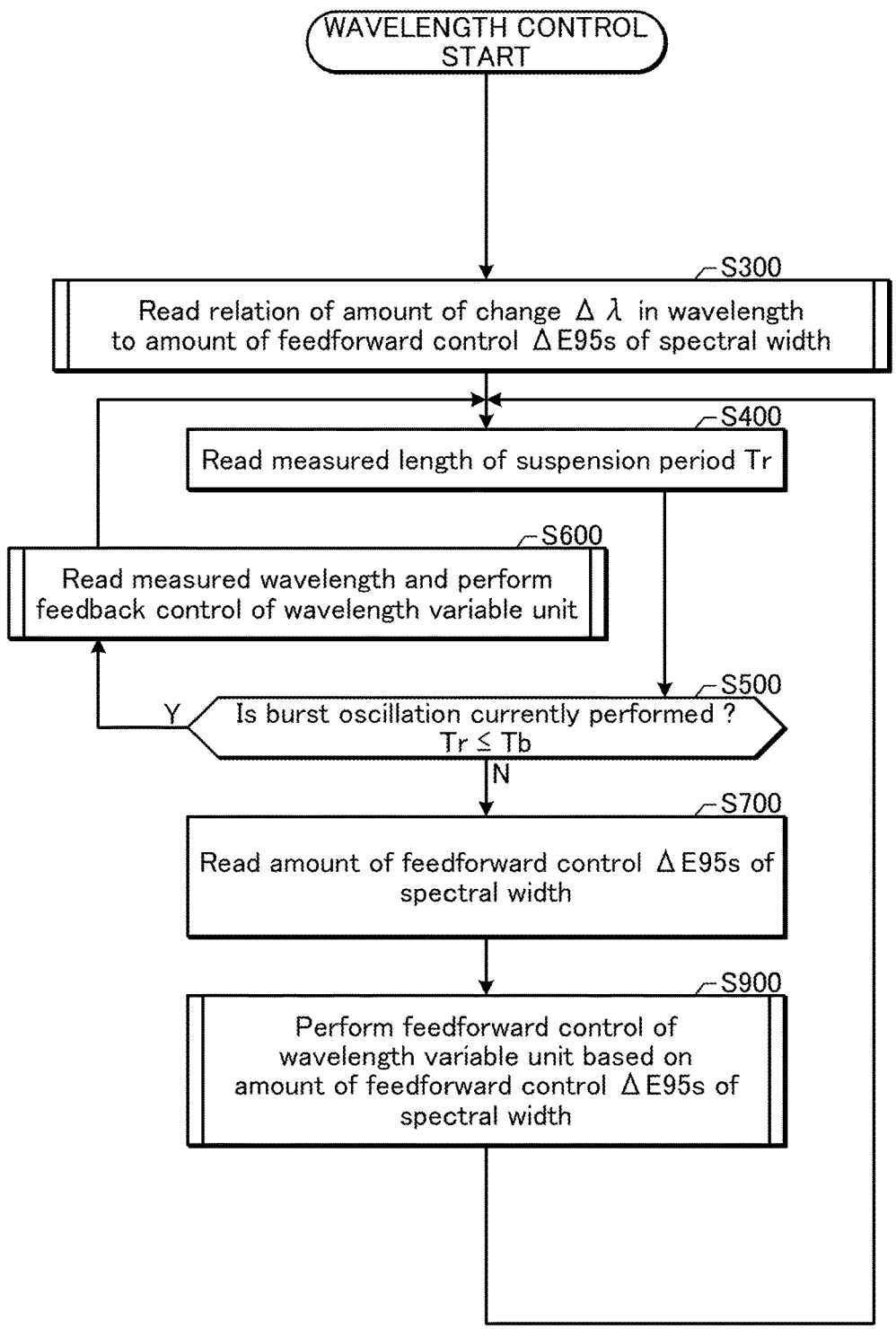
FIG. 16 is a flowchart showing a process of control of the wavelength performed by a laser controller 30 shown in FIG. 14.

FIG. 16 is a flowchart showing a process of the control of the wavelength performed by the laser controller 30 shown in FIG. 14. The laser controller 30 may perform a feedforward control of the wavelength (S900) based on the amount of feedforward control $\Delta E95s$ of the spectral width as follows. The process of the control of wavelength shown in FIG. 16 may be mainly performed by the wavelength controller 30d of the laser controller 30.

First, at S300 in FIG. 16, the laser controller 30 may read the data showing the relation of the amount of change $\Delta\lambda$ in the wavelength to the amount of feedforward control $\Delta E95s$ of the spectral width from an unillustrated storage device. Details of S300 will be described with reference to FIG. 17.

Next to S300, the process of S400 and S500 may be substantially the same as that in the comparative example described with reference to FIG. 12.

If the laser controller 30 determines at S500 that the burst oscillation is currently performed (S500: YES), the laser controller 30 may proceed to S600. The process of S600 may be substantially the same as that in the comparative example described with reference to FIG. 13.

If the laser controller 30 determines at S500 that the burst oscillation is not currently performed (S500: NO), the laser controller 30 may proceed to S700.

At S700, the laser controller 30 may read the amount of feedforward control $\Delta E95s$ of the spectral width that has been set by the spectral width controller 30a.

Next, at S900, the laser controller 30 may control the rotary stage 14d based on the amount of feedforward control $\Delta E95s$ of the spectral width. Namely, the laser controller 30 may perform the feedforward control of the wavelength.

After S900, the laser controller 30 may return to S400 and repeat the subsequent process.

2.2.1 First Example

FIGS. 17 and 18 are flowcharts each showing a subroutine of a process of a part of the flowchart shown in FIG. 16. FIGS. 17 and 18 show a first example of the process shown in FIG. 16.

With reference to FIG. 17 showing the subroutine of S300, the laser controller 30 may read, at S310, the relation of the amount of change Δλ in the wavelength to the amount of feedforward control ΔE95s of the spectral width in a form of a data table.

FIG. 19 shows a structure of the data table showing the relation of the amount of change Δλ in the wavelength to the amount of feedforward control ΔE95s of the spectral width. In the data table shown in FIG. 19, the amount of feedforward control ΔE95s of the spectral width may correspond one by one to the amount of change Δλ in the wavelength.

With reference to FIG. 18 showing the subroutine of S900, the laser controller 30 may read at S910, based on the amount of feedforward control ΔE95s of the spectral width, the amount of change Δλ in the wavelength caused by the feedforward control of the spectral width from the data table.

Next, the laser controller 30 may perform, at S930, the feedforward control of the wavelength to compensate for the amount of change Δλ in the wavelength from the wavelength λ just before starting the suspension period.

2.2.2 Second Example

FIGS. 20 and 21 are flowcharts each showing a subroutine of a process of a part of the flowchart shown in FIG. 16. FIGS. 20 and 21 show a second example of the process shown in FIG. 16.

With reference to FIG. 20 showing the subroutine of S300, the laser controller 30 may read, at S320, a parameter α showing a relation of the amount of change Δλ in the wavelength to the amount of feedforward control ΔE95s of the spectral width.

FIG. 22 is a graph showing an example of the relation of the amount of change Δλ in the wavelength to the amount of feedforward control ΔE95s of the spectral width as a linear function. In the case where the relation of the amount of change Δλ in the wavelength to the amount of feedforward control ΔE95s of the spectral width is the linear function, the parameter α may be the gradient of the linear function. The number of values of the parameter α may not be limited to one but may be two or more.

With reference to FIG. 21 showing the subroutine of S900, the laser controller 30 may calculate at S920, based on the amount of feedforward control ΔE95s of the spectral width, the amount of change Δλ in the wavelength caused by the feedforward control of the spectral width. The amount of change Δλ in the wavelength may be calculated, for example, by the following formula.

$$\Delta\lambda = \alpha * \Delta E95s$$

Next, the laser controller 30 may perform, at S930, the feedforward control of the wavelength to compensate for the amount of change Δλ in the wavelength from the wavelength λ just before starting the suspension period. This process may be substantially the same as that described with reference to FIG. 18.

3. Line Narrowed Laser Apparatus that Updates Data by Adjusting Oscillation (Second Embodiment)

3.1 Configuration

Figure 23:
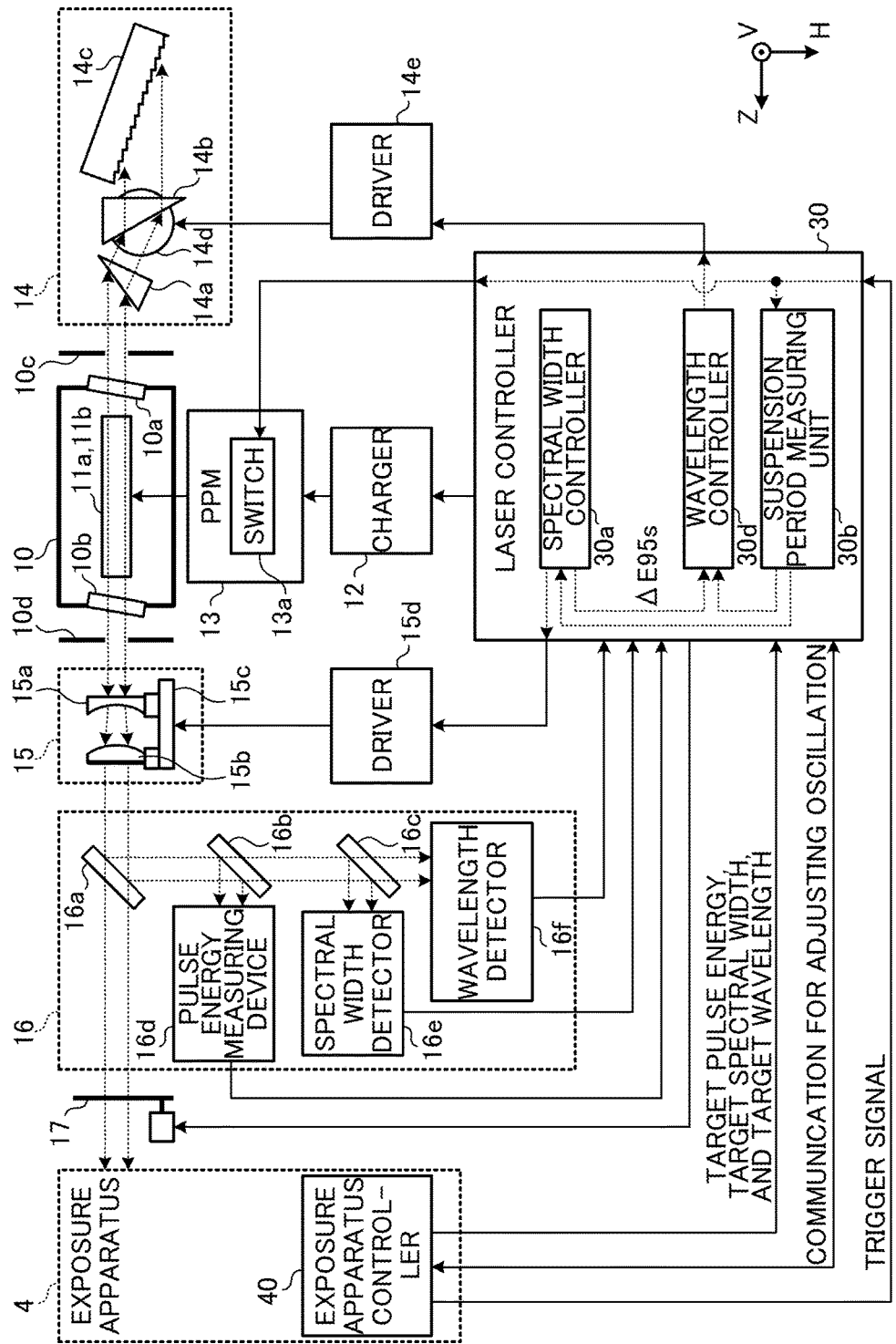
FIG. 23 schematically shows a configuration of a line narrowed laser apparatus according to a second embodiment of the present disclosure.

FIG. 23 schematically shows a configuration of a line narrowed laser apparatus according to a second embodiment of the present disclosure. The relation of the amount of change Δλ in the wavelength to the amount of feedforward control ΔE95s of the spectral width described in the first embodiment may change by changing of an amount of shift of the alignment of the plano-concave cylindrical lens 15a or the plano-convex cylindrical lens 15b. The second embodiment may thus perform an adjusting oscillation to acquire and update data on the relation of the amount of change Δλ in the wavelength to the amount of feedforward control ΔE95s of the spectral width.

In the second embodiment, the line narrowed laser apparatus may include, in addition to the configuration of the first embodiment described with reference to FIG. 14, a shutter 17 which is capable of opening and closing. The shutter 17 may be in a closed state during the adjusting oscillation to suppress inputting the pulse laser beam to the exposure apparatus 4.

Further, in the second embodiment, a signal line may be connected between the laser controller 30 and the exposure apparatus controller 40 to send or receive control signals for the adjusting oscillation.

3.2 Operation

3.2.1 Main Flow

Figure 24:
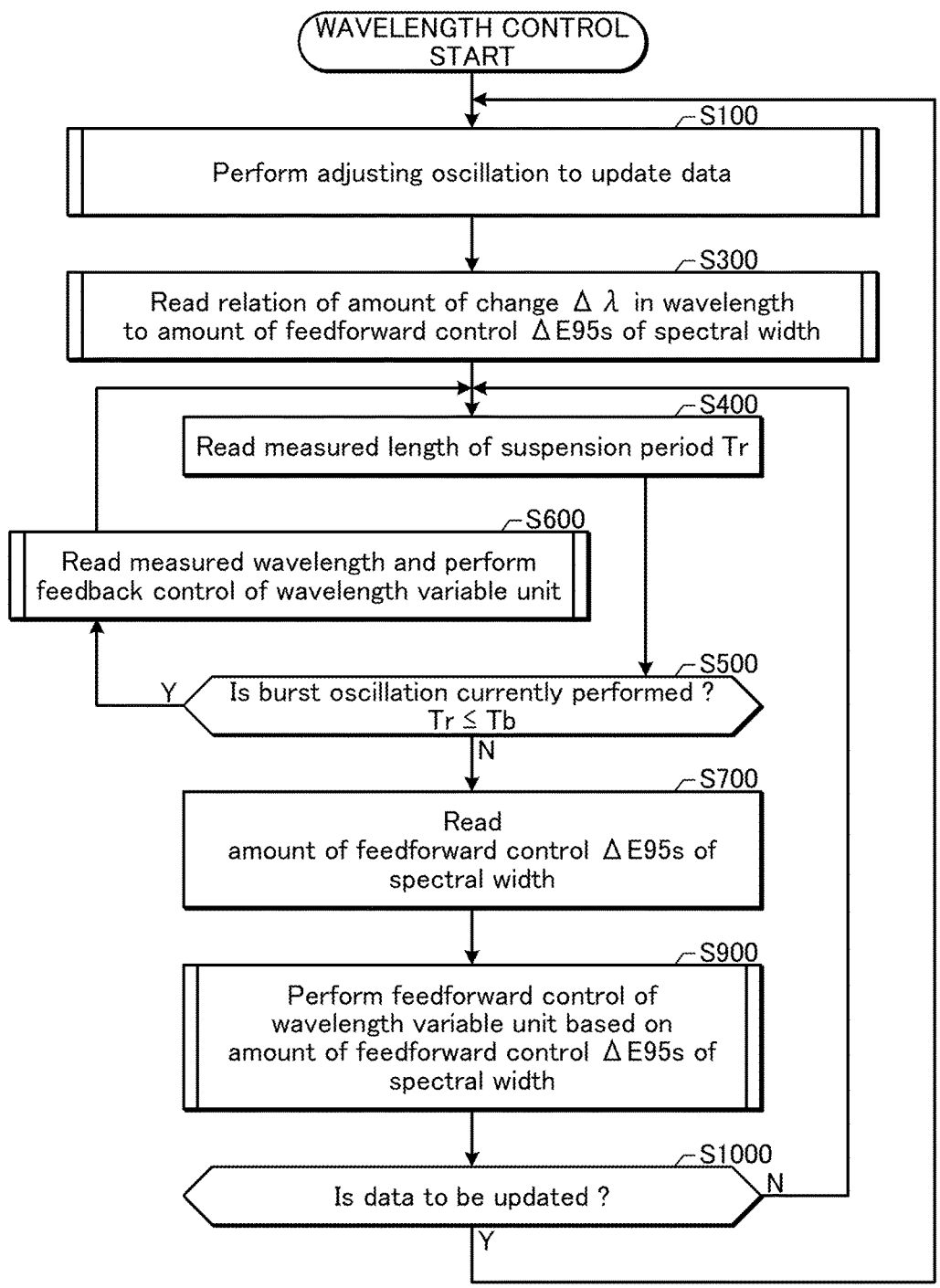
FIG. 24 is a flowchart showing a process of a laser controller 30 shown in FIG. 23.

FIG. 24 is a flowchart showing a process of the laser controller 30 shown in FIG. 23. As described below, the laser controller 30 may perform, in addition to the control of the wavelength, the adjusting oscillation to update the data.

Firstly, at S100, the laser controller 30 may perform the adjusting oscillation to update the data on the relation of the amount of change Δλ in the wavelength to the amount of feedforward control ΔE95s of the spectral width.

Details of the process of S100 will be described below with reference to FIG. 25.

The process next to S100, from S300 to S900, may be substantially the same as that in the first embodiment described with reference to FIG. 16.

After S900, at S1000, the laser controller 30 may determine whether the data is to be updated by the adjusting oscillation. For example, the data may be updated if a predetermined period has passed since the previous update. Alternatively, the data may be updated if an absolute value of the difference between the target wavelength and a wavelength at the time of starting the burst oscillation exceeds a predetermined value.

If the data is to be updated (S1000: YES), the laser controller 30 may return to S100 described above to perform the adjusting oscillation. If the data is not to be updated (S1000: NO), the laser controller 30 may return to S400 described above, to continue the control of the wavelength using the data that has been measured.

3.2.2 Details of Adjusting Oscillation

Figure 25:
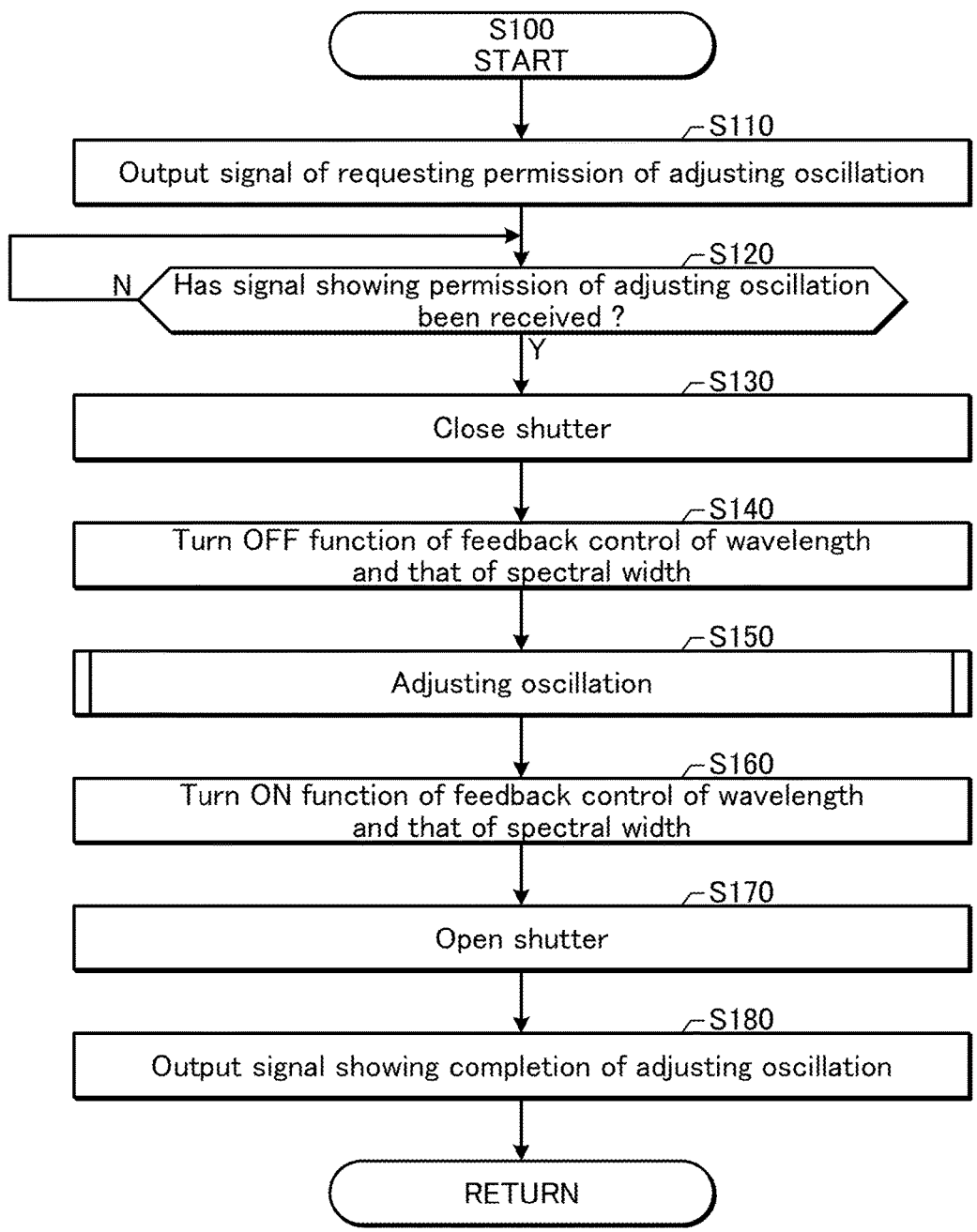
FIG. 25 is a flowchart showing details of a process of an adjusting oscillation shown in FIG. 24.

FIG. 25 is a flowchart showing details of a process of the adjusting oscillation shown in FIG. 24. The process shown in FIG. 25 may be performed by the laser controller 30 as a subroutine of S100 shown in FIG. 24.

Firstly, at S110, the laser controller 30 may output a signal of requesting permission of the adjusting oscillation to the exposure apparatus controller 40.

Next, at S120, the laser controller 30 may determine whether it has received a signal showing permission of the adjusting oscillation from the exposure apparatus controller 40. If the laser controller 30 has not received the signal showing permission of the adjusting oscillation (S120: NO), the laser controller 30 may wait until receiving the signal showing permission of the adjusting oscillation. If the laser controller 30 has received the signal showing permission of the adjusting oscillation (S120: YES), the laser controller 30 may proceed to S130. The exposure apparatus controller 40 may stop the control of the wafer stage or the like during the adjusting oscillation.

At S130, the laser controller 30 may close the shutter 17.

Next, at S140, the laser controller 30 may turn OFF the function of the feedback control of the wavelength and that of the spectral width. Namely, during the adjusting oscillation, the feedback control of the spectral width or the feedback control of the wavelength such as S600 may not necessarily be performed.

Next, at S150, the laser controller 30 may perform the adjusting oscillation to measure the relation of the amount of change $\Delta\lambda$ in the wavelength to the amount of feedforward control $\Delta E95s$ of the spectral width.

Details of the process of S150 will be described below with reference to FIG. 26.

After the adjusting oscillation ends, at S160, the laser controller 30 may turn ON the function of the feedback control of the wavelength and that of the spectral width.

Next, at S170, the laser controller 30 may open the shutter 17.

Next, at S180, the laser controller 30 may output a signal showing completion of the adjusting oscillation to the exposure apparatus controller 40.

After S180, the laser controller 30 may end the process of this flowchart.

Figure 26:
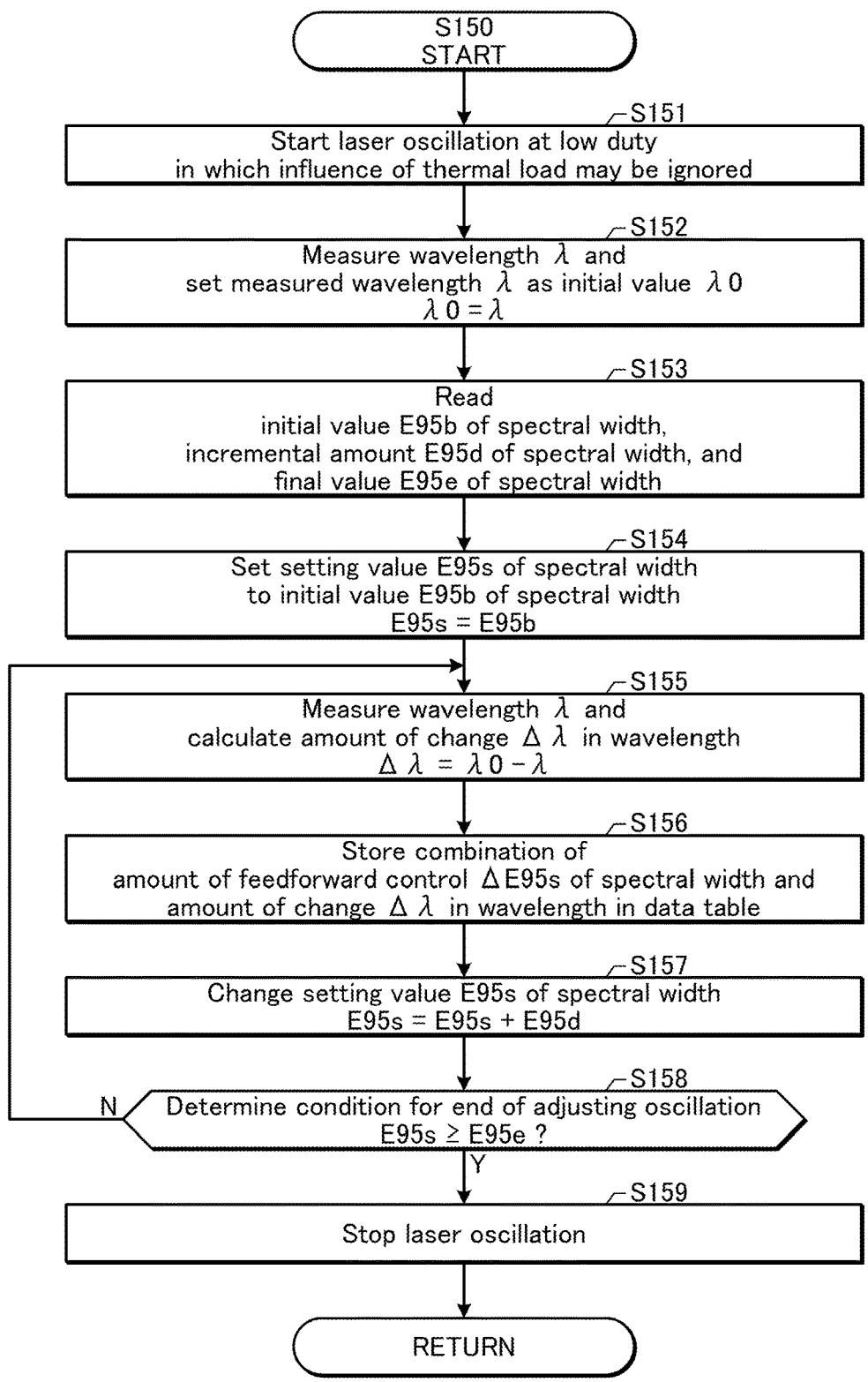
FIG. 26 is a flowchart showing details of the process of the adjusting oscillation shown in FIG. 25.

FIG. 26 is a flowchart showing details of the process of the adjusting oscillation shown in FIG. 25. The process shown in FIG. 26 may be performed by the laser controller 30 as a subroutine of S150 shown in FIG. 25. As described below, the laser controller 30 may measure the amount of change $\Delta\lambda$ in the wavelength with various values of the amount of feedforward control $\Delta E95s$ of the spectral width, to obtain the relation of the amount of change $\Delta\lambda$ in the wavelength to the amount of feedforward control $\Delta E95s$ of the spectral width.

Firstly, at S151, the laser controller 30 may start outputting the trigger signal at a predetermined low duty to cause laser oscillation in a low repetition frequency. Here, the predetermined low duty may be a duty in which an influence of the thermal load on the optical elements may be substantially ignored. For example, if the maximum repetition frequency of the laser apparatus is 6000 Hz, the predetermined low duty may correspond to a repetition frequency of 100 Hz.

Next, at S152, the laser controller 30 may measure the current value of the wavelength $\lambda$ and store the measured wavelength $\lambda$ as an initial value $\lambda 0$ to an unillustrated storage device.

Next, at S153, the laser controller 30 may read parameters regarding a setting value E95s of the spectral width from an unillustrated storage device. The parameters regarding the setting value E95s of the spectral width may include the following values.

E95b: An initial value of the spectral width
E95d: An incremental amount of the spectral width
E95e: A final value of the spectral width Here, the initial value E95b of the spectral width may be a minimum value of the setting value E95s of the spectral width. The final value E95e of the spectral width may be a maximum value of the setting value E95s of the spectral width.

Next, at S154, the laser controller 30 may set the setting value E95s of the spectral width to the initial value E95b of the spectral width as follows.

$$E95s=E95b$$

Next, at S155, the laser controller 30 may measure the current value of the wavelength $\lambda$ and calculate the amount of change $\Delta\lambda$ in the wavelength based on the current value of the wavelength $\lambda$ and the initial value $\lambda 0$ as follows.

$$\Delta\lambda=\lambda 0-\lambda$$

Next, at S156, the laser controller 30 may calculate the amount of feedforward control $\Delta E95s$ of the spectral width as follows.

$$\Delta E95s=E95s-E95b$$

Further, the laser controller 30 may store a combination of the calculated amount of feedforward control $\Delta E95s$ of the spectral width and the amount of change $\Delta\lambda$ in the wavelength in the data table. The data table may be that described with reference to FIG. 19.

Next, at S157, the laser controller 30 may add the incremental amount E95d of the spectral width to the current setting value E95s of the spectral width to change and set the setting value E95s of the spectral width as follows.

$$E95s=E95s+E95d$$

Next, at S158, the laser controller 30 may determine the condition for the end of the adjusting oscillation. The condition for the end of the adjusting oscillation may be a condition showing that the current setting value E95s of the spectral width has reached the final value E95e of the spectral width as follows.

$$E95s \geq E95e$$

If the condition for the end of the adjusting oscillation is not satisfied (S158: NO), the laser controller 30 may return to S155 and repeat the measurement of the relation of the amount of change $\Delta\lambda$ in the wavelength to the amount of feedforward control $\Delta E95s$ of the spectral width.

If the condition for the end of the adjusting oscillation is satisfied (S158: YES), the laser controller 30 may proceed to S159.

At S159, the laser controller 30 may stop the adjusting oscillation and then and the process of this flowchart.

4. Line Narrowed Laser Apparatus that Performs Feedforward Control of Wavelength According to Thermal Load (Third Embodiment)

4.1 Configuration

Figure 27:
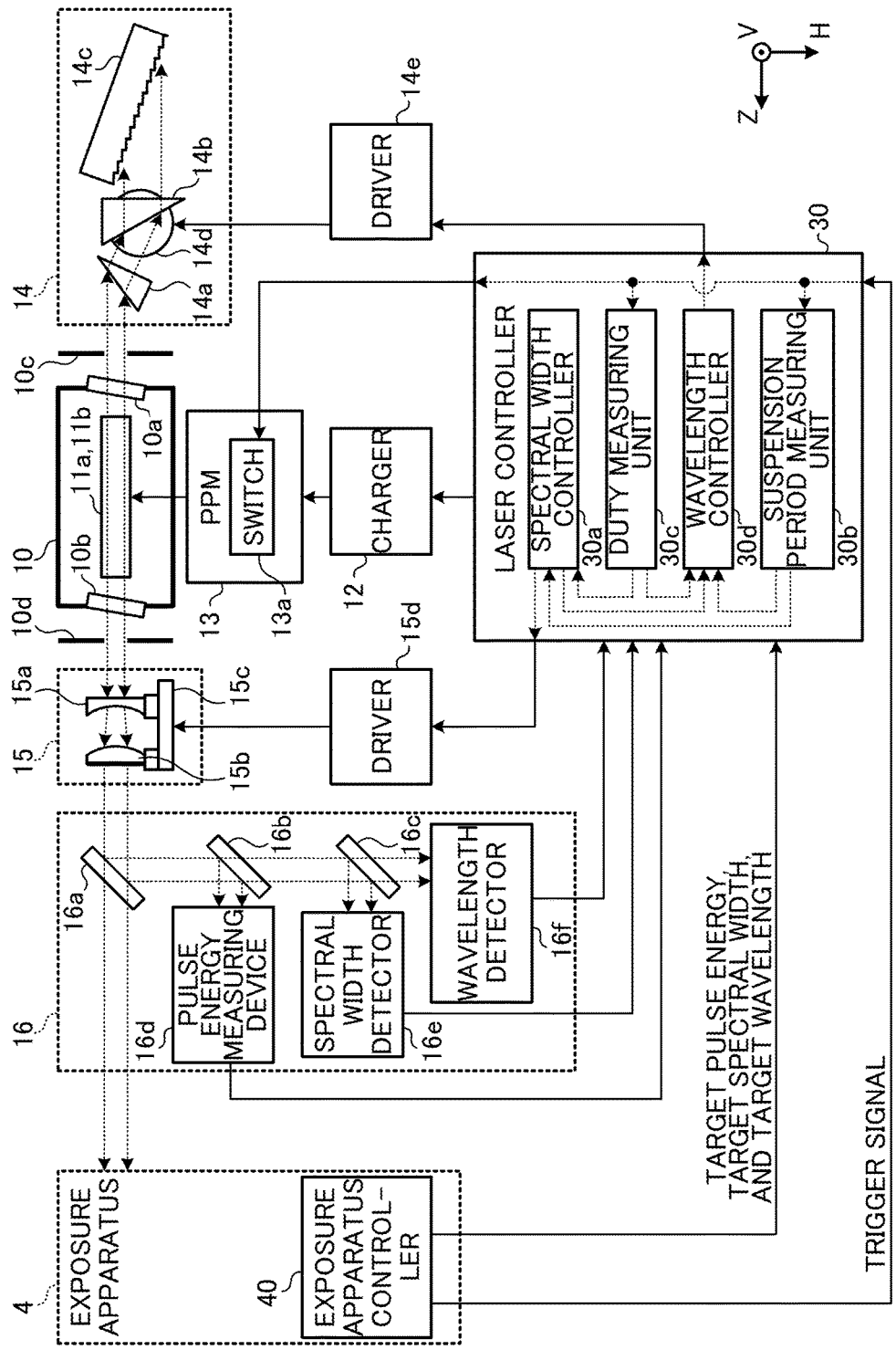
FIG. 27 schematically shows a configuration of a line narrowed laser apparatus according to a third embodiment of the present disclosure.

FIG. 27 schematically shows a configuration of a line narrowed laser apparatus according to a third embodiment of the present disclosure. In the suspension period suspending the burst oscillation, characteristics of the optical elements of the line narrow module 14, as well as those of the spectral width varying unit 15, may change. If the thermal load in the previous burst oscillation is high, the change in the characteristics in the suspension period suspending the burst oscillation may be large. If the suspension period suspending the burst oscillation is long, the change in the characteristics may be large. In the third embodiment, a feedforward control of the wavelength may be performed based on both the duty in the previous burst oscillation and the length of the suspension period suspending the burst oscillation.

In the third embodiment, the laser controller 30 of the line narrowed laser apparatus may include, in addition to the configuration of the first embodiment described with reference to FIG. 14, a duty measuring unit 30c. The duty measuring unit 30c may be configured as a program module loaded on the memory 1002 described below included in the laser controller 30.

The duty measuring unit 30c may measure the duty of the pulse laser beam in the burst oscillation based on the trigger signal outputted from the exposure apparatus controller 40. The duty of the pulse laser beam may be, for example, a ratio of the actual number of pulses in a predetermined period to the number of pulses in the case where the laser oscillation is performed in the predetermined period at the maximum repetition frequency. The duty D may be defined by the following formula.

$$D=N/(fmax \cdot TK)$$

Here, fmax may be the maximum repetition frequency of the laser apparatus. TK may be a sampling time. N may be the number of pulses in the sampling time TK.

The value of the duty may be outputted from the duty measuring unit 30c to the wavelength controller 30d.

Figures 28, 29:
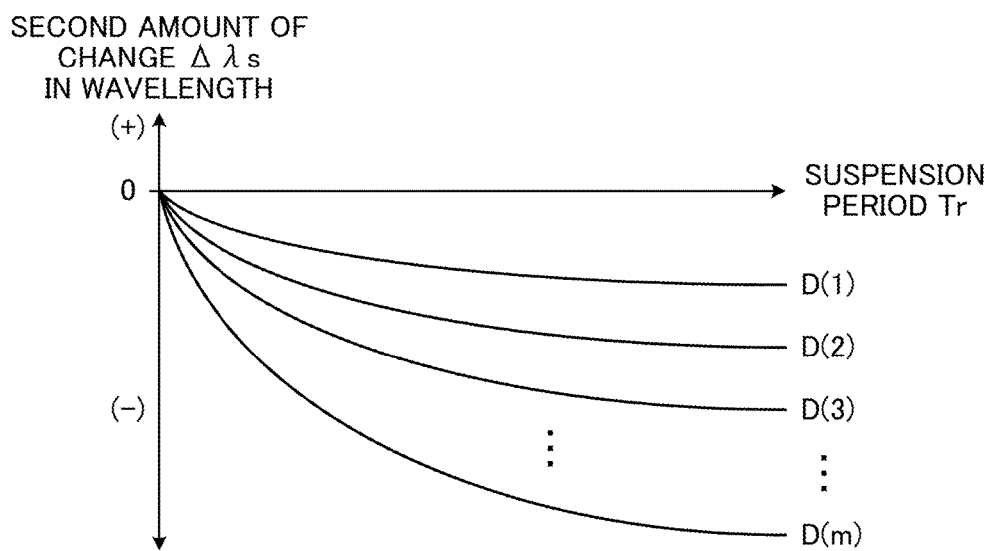
FIG. 28 shows a relation of a second amount of change $\Delta\lambda s$ in the wavelength caused by a change in the thermal load in the suspension period suspending the burst oscillation to the length of the suspension period Tr for each value of duty D in a previous burst oscillation.
FIG. 29 shows a structure of a data table showing a relation of the second amount of change $\Delta\lambda s$ in the wavelength to a combination of the duty D in the previous burst oscillation and the length of the suspension period Tr.

FIG. 28 shows a relation of a second amount of change $\Delta\lambda s$ in the wavelength caused by the change in the thermal load to the length of the suspension period Tr for each value of the duty D in the previous burst oscillation. In the following description, an amount of change $\Delta\lambda s$ in the wavelength caused by the change in the thermal load may be referred to as a second amount of change $\Delta\lambda s$ in the wavelength to distinguish it with the amount of change $\Delta\lambda$ in the wavelength caused by the feedforward control of the spectral width. The amount of change in the wavelength in the suspension period suspending the burst oscillation may correspond to a total of the amount of change $\Delta\lambda$ in the wavelength caused by the feedforward control of the spectral width and the second amount of change $\Delta\lambda s$ in the wavelength caused by the change in the thermal load.

As shown in FIG. 28, the second amount of change $\Delta\lambda s$ in the wavelength may have a relation similar to a damping function with a first order lag with the length of the suspension period Tr for each of the values of the duty D in the previous burst period. The absolute value of the second amount of change $\Delta\lambda s$ in the wavelength may be small in a low duty D. The absolute value of the second amount of change $\Delta\lambda s$ in the wavelength may be large in a high duty D. Thus, the rotary stage 14d may be controlled according to the combination of the duty D and the length of the suspension period Tr. This may allow the wavelength at the time of starting of the next burst oscillation to be adjusted at a high accuracy.

FIG. 29 shows a structure of a data table showing the relation of the second amount of change $\Delta\lambda s$ in the wavelength to the combination of the duty D in the previous burst oscillation and the length of the suspension period Tr. In the data table shown in FIG. 29, the combination of the duty D and the length of the suspension period Tr may correspond one by one to the second amount of change $\Delta\lambda s$ in the wavelength.

4.2 Operation

Figure 30:
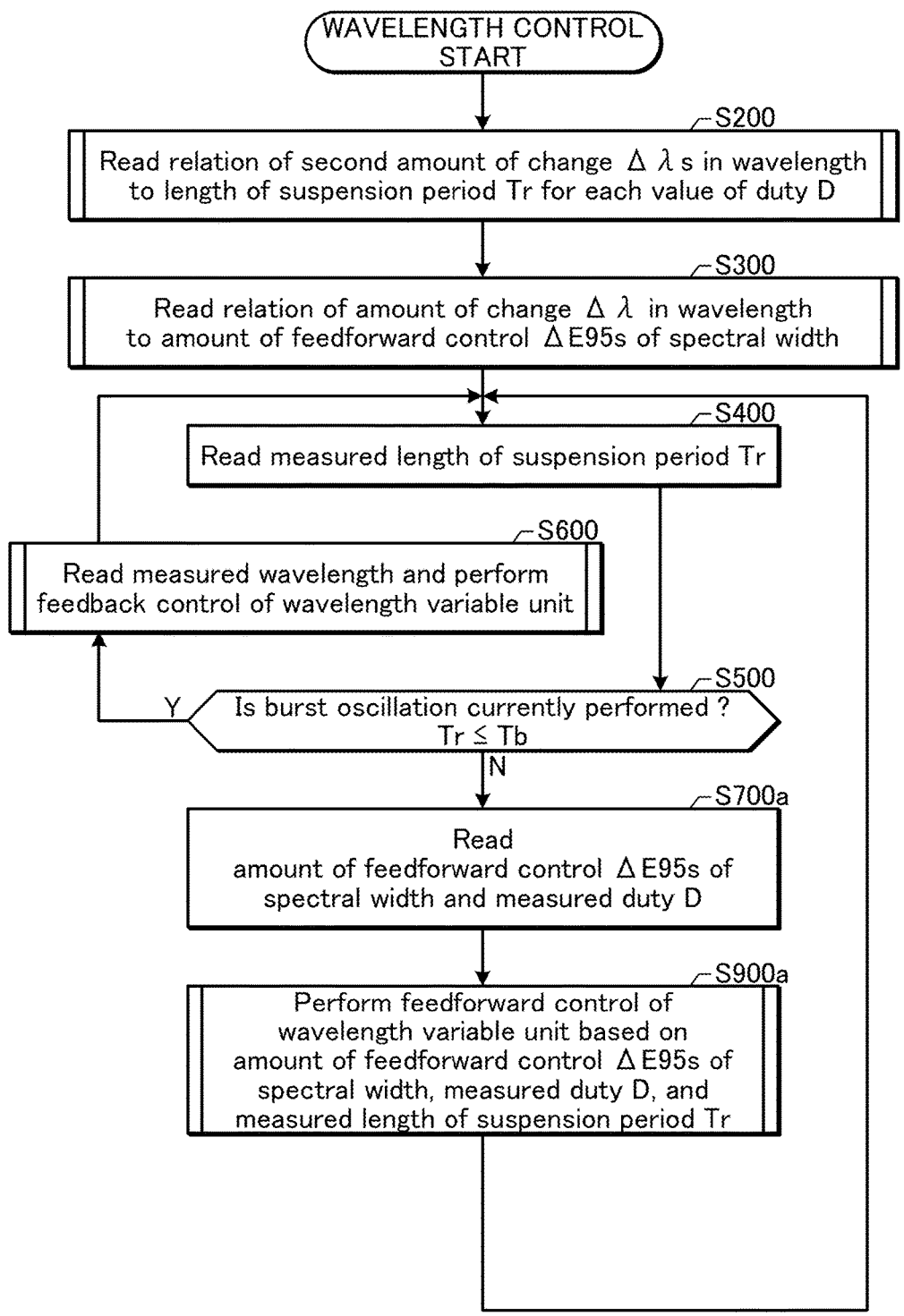
FIG. 30 is a flowchart showing a process of control of the wavelength performed by a laser controller 30 shown in FIG. 27.
Figure 31:
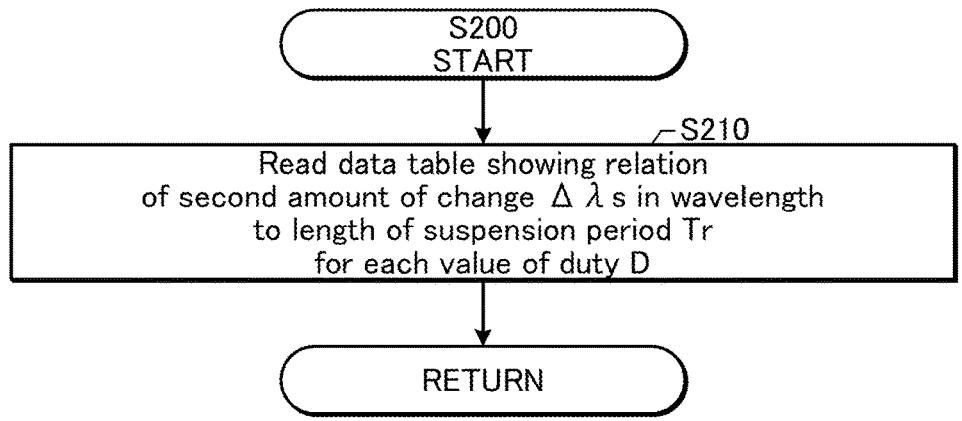
FIG. 31 is a flowchart showing a subroutine of a process of S200 shown in FIG. 30.
Figure 32:
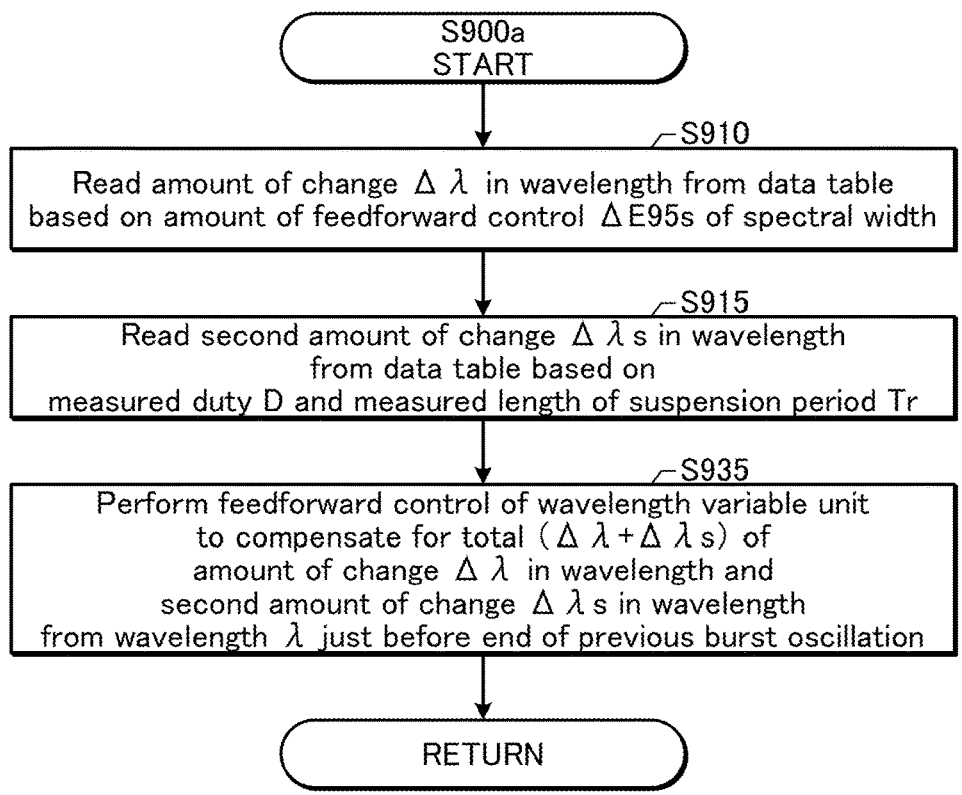
FIG. 32 is a flowchart showing a subroutine of a process of S900a shown in FIG. 30.

FIG. 30 is a flowchart showing a process of control of the wavelength performed by the laser controller 30 shown in FIG. 27. FIGS. 31 and 32 are flowcharts each showing a subroutine of a process of a part of the flowchart shown in FIG. 30. The laser controller 30 may perform the feedforward control of the wavelength (S900a) based not only on the amount of feedforward control $\Delta E95s$ of the spectral width but on the duty D and the length of the suspension period Tr. The process of the control of the wavelength shown in FIGS. 30 to 32 may mainly be performed by the wavelength controller 30d of the laser controller 30.

Firstly, at S200 in FIG. 30, the laser controller 30 may read data showing the relation of the second amount of change $\Delta\lambda s$ in the wavelength to the length of the suspension period Tr for each value of the duty D in an unillustrated storage device.

With reference to FIG. 31 showing the subroutine of S200, the laser controller 30 may read, at S210, the relation of the second amount of change $\Delta\lambda s$ in the wavelength to the length of the suspension period Tr for each value of the duty D in a form of a data table.

With reference back to FIG. 30, the process from S300 to S500 may be substantially the same as that in the first embodiment described above with reference to FIG. 16.

If the laser controller 30 determines at S500 that the burst oscillation is currently performed (S500: YES), the laser controller 30 may proceed to S600. The process of S600 may be substantially the same as that in the first embodiment described with reference to FIG. 16.

If the laser controller 30 determines at S500 that the burst oscillation is not currently performed (S500: NO), the laser controller 30 may proceed to S700a.

At S700a, the laser controller 30 may read the amount of feedforward control $\Delta E95s$ of the spectral width set by the spectral width controller 30a. The laser controller 30 may further read the duty D in the previous burst oscillation measured by the duty measuring unit 30c.

Next, at S900a, the laser controller 30 may control the rotary stage 14d based on the amount of feedforward control $\Delta E95s$ of the spectral width, the duty D in the previous burst oscillation, and the length of the suspension period Tr read at S400. Namely, the laser controller 30 may perform the feedforward control of the wavelength.

After S900a, the laser controller 30 may return to S400 and repeat the subsequent process.

In the subroutine of S900a shown in FIG. 32, the process of S910 may be substantially the same as that of the first example of the first embodiment described with reference to FIG. 18.

As shown in FIG. 32, at S915 next to S910, the laser controller 30 may read, from the data table, the second amount of change $\Delta\lambda s$ in the wavelength based on the duty D in the previous burst oscillation and the length of the suspension period Tr read at S400.

Next, the laser controller 30 may perform, at S935, the feedforward control of the wavelength to compensate for a total of the amount of change $\Delta\lambda$ in the wavelength and the second amount of change $\Delta\lambda s$ in the wavelength from the wavelength h just before the end of the previous burst oscillation.

Instead of reading the data table in FIG. 31, parameters showing a relation of the second amount of change $\Delta\lambda s$ in the wavelength to the length of the suspension period Tr may be read for each of the values of the duty D. If the relation of the second amount of change $\Delta\lambda s$ in the wavelength to the length of the suspension period Tr is represented by the following damping function with a first order lag, the laser controller 30 may read two parameters $\alpha 1$ and $\beta$ in the damping function.

$$\Delta\lambda s = D^* \alpha 1 \cdot \{\exp(-Tr/\beta) - 1\}$$

Further, instead of reading the amount of change $\Delta\lambda$ in the wavelength in FIG. 32 from the data table, the laser controller 30 may calculate the amount of change $\Delta\lambda$ in the wavelength as described with reference to S920 in FIG. 21. Instead of reading the second amount of change $\Delta\lambda s$ in the wavelength from the data table, the laser controller 30 may calculate the second amount of change Δλs in the wavelength using the formula described above.

Figure 33:
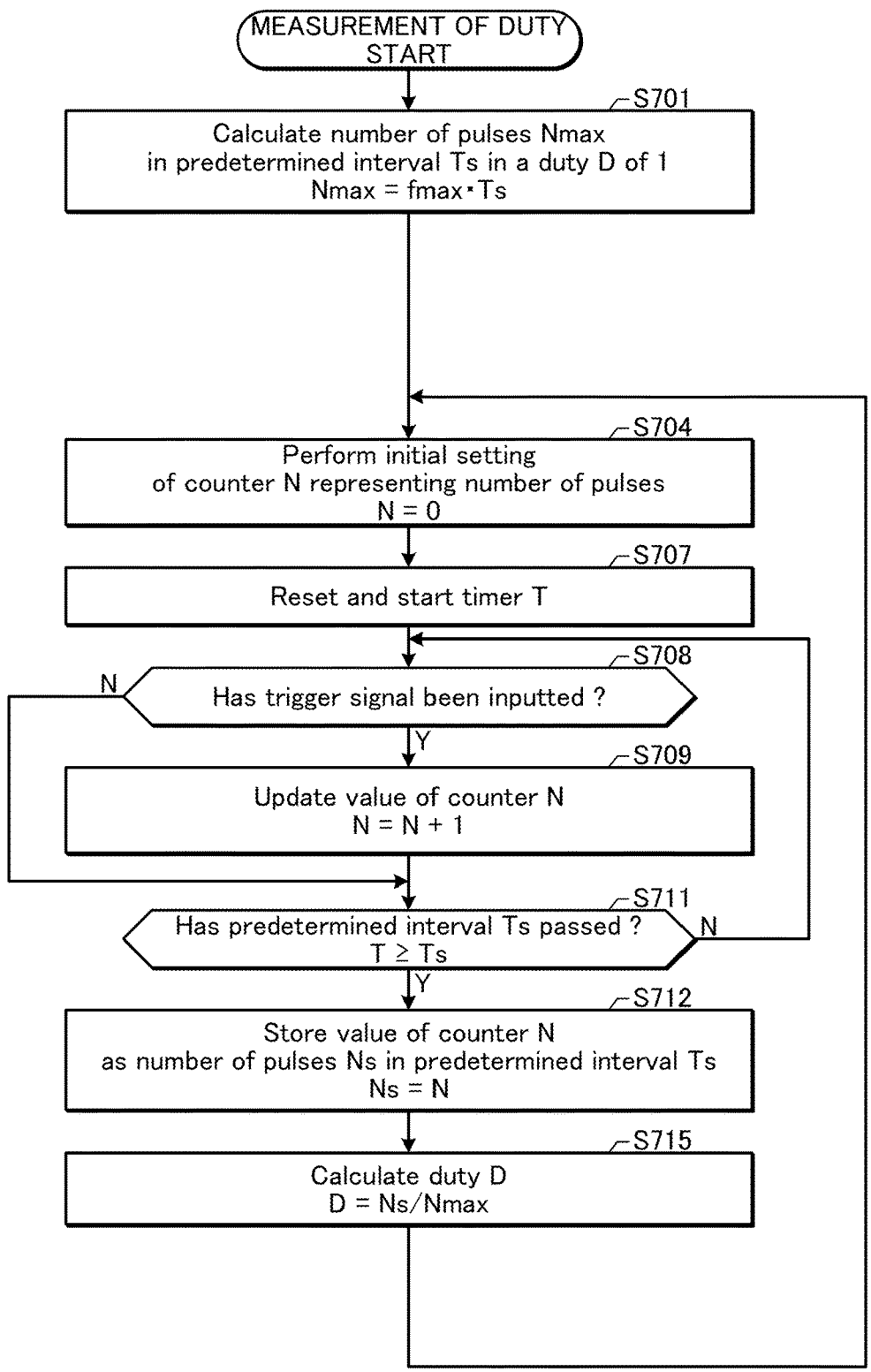
FIG. 33 is a flowchart showing a process of the measurement of the duty performed by a duty measuring unit 30c shown in FIG. 27.

FIG. 33 is a flowchart showing a process of the measurement of the duty performed by the duty measuring unit 30c shown in FIG. 27. The process of the measurement of the duty may be performed by the duty measuring unit 30c separately from the control of the wavelength described above with reference to FIG. 30. The duty measuring unit 30c may measure the duty of the pulse laser beam in the following process. The process of measuring the duty of the pulse laser beam may be performed during the period of burst oscillation. The process may not necessarily be performed during the suspension period suspending the burst oscillation.

Firstly, at S701, the duty measuring unit 30c may calculate the number of pulses Nmax in a predetermined interval Ts in a case where the laser oscillation is performed at a duty D of 1 by the following formula.

$$Nmax=fmax*Ts$$

Here, fmax may be the maximum repetition frequency of the line narrowed laser apparatus.

Next, at S704, the duty measuring unit 30c may perform an initial setting of the value of a counter N representing the number of pulses to 0.

Next, at S707, the duty measuring unit 30c may reset and start a timer T.

Next, at S708, the duty measuring unit 30c may determine whether a pulse of the trigger signal has been inputted. If a pulse of the trigger signal has been inputted (S708: YES), the duty measuring unit 30c may proceed to S709.

At S709, the duty measuring unit 30c may add 1 to the current value of the counter N to update the value of the counter N. After S709, the duty measuring unit 30c may proceed to S711.

If a pulse of the trigger signal has not been inputted (S708: NO), the duty measuring unit 30c may skip S709 and proceed to S711. Namely, the value of the counter N may not be updated.

At S711, the duty measuring unit 30c may compare the value of the timer T with the predetermined interval Ts to determine whether the predetermined interval Ts has passed since the timer T started. Here, the predetermined interval Ts may be, for example, 1 minute or longer, 10 minutes or shorter.

If the predetermined interval Ts has not passed (S711: NO), the duty measuring unit 30c may return to S708 described above to determine whether a new pulse of the trigger signal has been inputted.

If the predetermined interval Ts has passed (S711: YES), the duty measuring unit 30c may proceed to S712.

At S712, the duty measuring unit 30c may store the current value of the counter N in an unillustrated storage device as the number of pulses Ns in the predetermined interval Ts.

Next, at S715, the duty measuring unit 30c may calculate the duty D by the following formula.

$$D=Ns/Nmax$$

As described above, the ratio of the actual number of pulses in the predetermined interval Ts to the number of pulses in the case where the laser oscillation is performed at the maximum repetition frequency in the predetermined interval Ts may be calculated as the duty D.

5. Details of Spectral Width Varying Unit

Figure 34A:
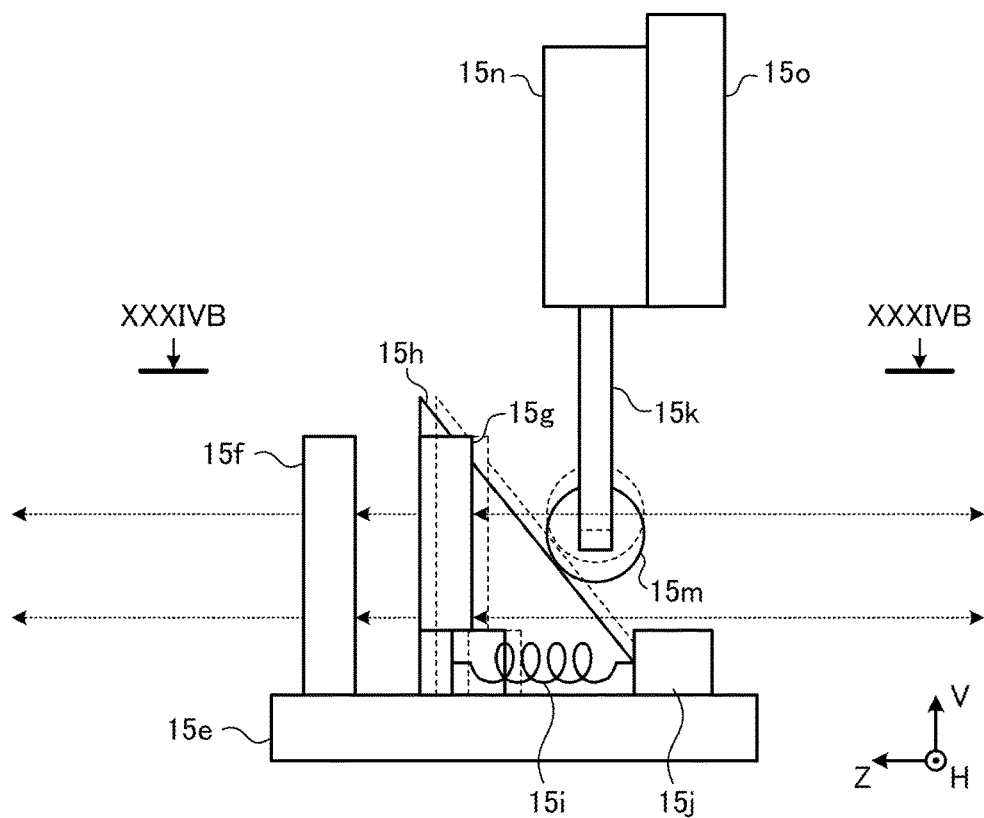
FIG. 34A schematically shows a configuration of a spectral width varying unit 15 shown in FIGS. 14, 23, and 27.
Figure 34B:
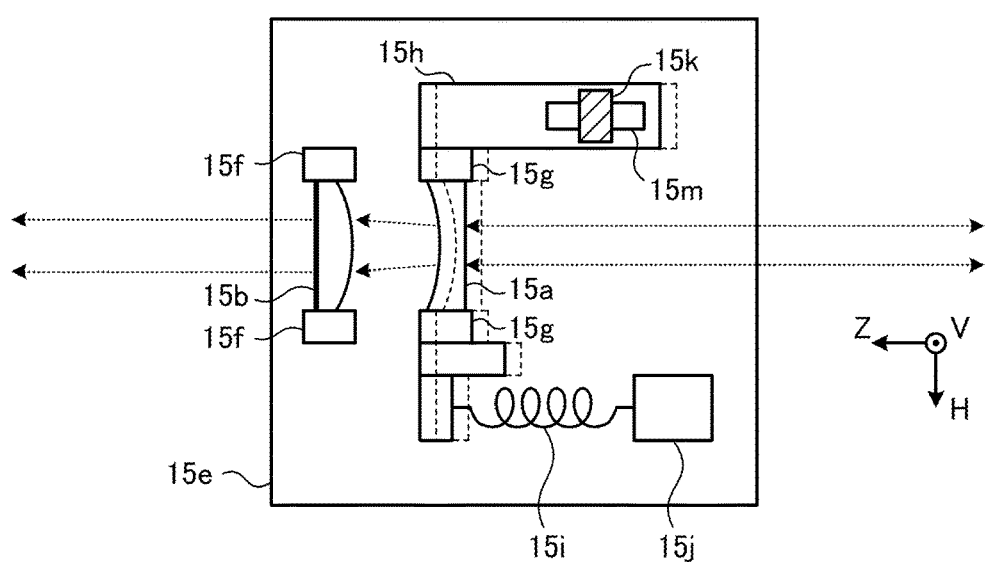
FIG. 34B schematically shows the configuration of the spectral width varying unit 15 shown in FIGS. 14, 23, and 27.

FIGS. 34A and 34B schematically show a configuration of the spectral width varying unit 15 shown in FIGS. 14, 23, and 27. FIG. 34A shows the spectral width varying unit 15 as viewed in the −H direction. FIG. 34B shows a section at line XXXIVB-XXXIVB in FIG. 34A and structures positioned lower than the section as viewed in the −V direction.

The spectral width varying unit 15 may include the plano-concave cylindrical lens 15a and the piano-convex cylindrical lens 15b. The plano-convex cylindrical lens 15b may be fixed to a plate 15e by a holder 15f.

The plano-concave cylindrical lens 15a may be fixed to a holder 15g. An unillustrated linear guide member may allow the holder 15g to move in the Z direction and the −Z direction relative to the plate 15e without changing the posture of the holder 15g.

A slope member 15h and one end of a spring 15i may be fixed to the holder 15g. The other end of the spring 15i may be fixed to a fixing member 15j. The fixing member 15j may be fixed to the plate 15e. The holder 15g may be continuously pulled by the spring 15i in the −Z direction.

A wheel 15m attached to an end of a rod 15k may be in contact with a slant face of the slope member 15h. A linear motor 15n may cause the rod 15k with the wheel 15m to move back and forth in the V direction and the −V direction. The linear motor 15n may be fixed to a fixing member 15o at a fixed position relative to the plate 15e.

The wheel 15m moving in the −V direction may push the slope member 15h in the Z direction. The holder 15g with the plano-concave cylindrical lens 15a may thus move in the Z direction.

The wheel 15m moving in the V direction may allow the holder 15g with the plano-concave cylindrical lens 15a to move in the −Z direction by being pulled by the spring 15i in the −Z direction.

The plano-concave cylindrical lens 15a may thus be movable in the Z direction and the −Z direction.

Here, the plano-convex cylindrical lens 15b may be coated with the partially reflective film, and the spectral width varying unit 15 may function as an output coupling mirror. However, the present disclosure is not limited to this configuration. An output coupling mirror may further be provided and a spectral width varying unit may be provided in the optical resonator.

6. Configuration of Controller

Figure 35:
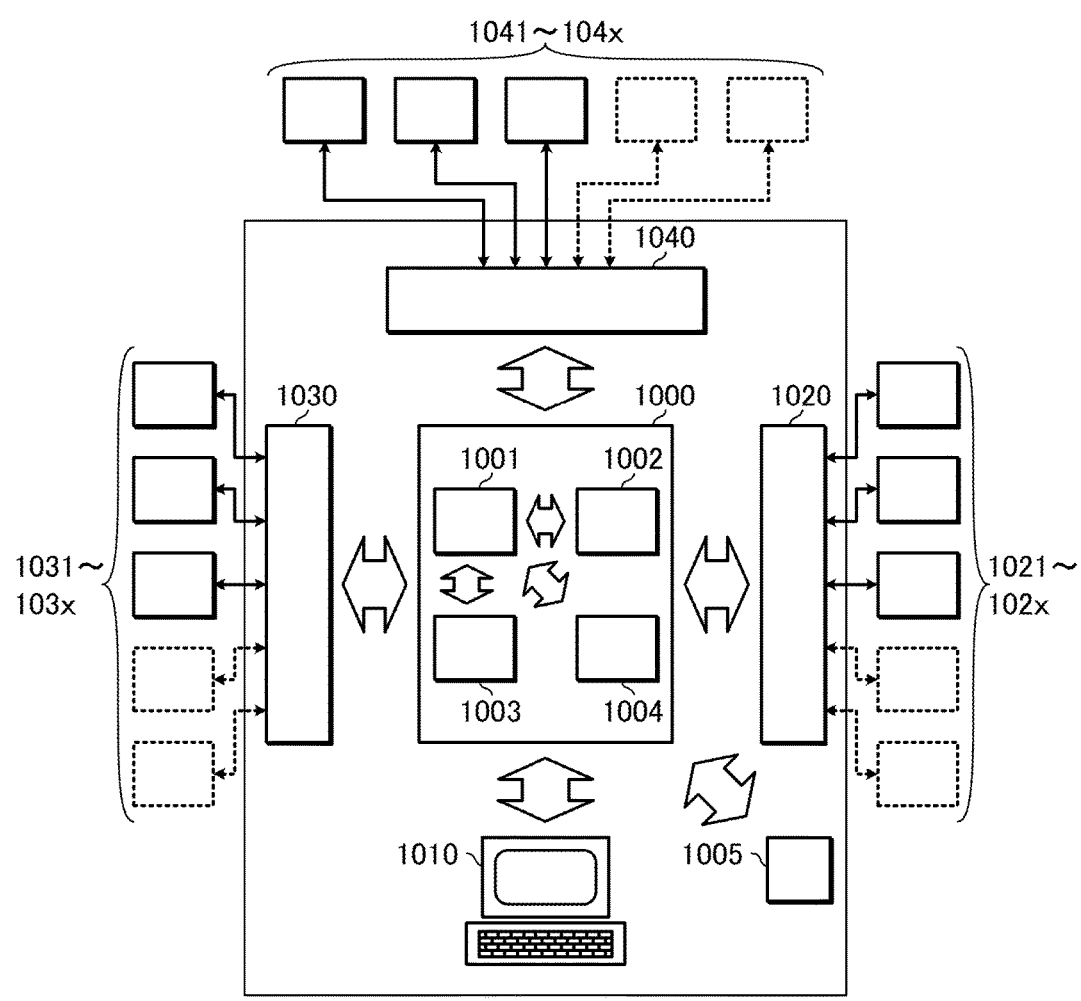
FIG. 35 is a block diagram schematically showing a configuration of the controller.

FIG. 35 is a block diagram schematically showing a configuration of the controller.

Controllers of the above-described embodiments, such as the laser controller 30, may be general-purpose control devices, such as computers or programmable controllers. For example, the controllers may be configured as follows.

Configuration

The controllers may each include a processor 1000, and a storage memory 1005, a user interface 1010, a parallel input/output (I/O) controller 1020, a serial I/O controller 1030, and an analog-to-digital (A/D) and digital-to-analog (D/A) converter 1040 which are connected to the processor 1000. The processor 1000 may include a central processing unit (CPU) 1001, and a memory 1002, a timer 1003, and a graphics processing unit (GPU) 1004 which are connected to the CPU 1001.

Operation

The processor 1000 may read a program stored in the storage memory 1005, execute the read program, read data from the storage memory 1005 in accordance with the program, or store data in the storage memory 1005.

The parallel I/O controller 1020 may be connected to devices 1021 to 102x with which it may communicate through parallel I/O ports. The parallel I/O controller 1020 may control digital-signal communication through the parallel I/O ports while the processor 1000 executes the program.

The serial I/O controller 1030 may be connected to devices 1031 to 103$x$ with which it may communicate through serial I/O ports. The serial I/O controller 1030 may control digital-signal communication through the serial I/O ports while the processor 1000 executes the program.

The A/D and D/A converter 1040 may be connected to devices 1041 to 104$x$ with which it may communicate through analog ports. The A/D and D/A converter 1040 may control analog-signal communication through the analog ports while the processor 1000 executes the program.

The user interface 1010 may be configured to display the progress of the program being executed by the processor 1000 in accordance with instructions from an operator, or to cause the processor 1000 to stop the execution of the program or perform an interrupt in accordance with instructions from the operator.

The CPU 1001 of the processor 1000 may perform arithmetic processing of the program. The memory 1002 may temporarily store the program being executed by the CPU 1001 or temporarily store data in the arithmetic processing. The timer 1003 may measure time or elapsed time and output it to the CPU 1001 in accordance with the program being executed. When image data is inputted to the processor 1000, the GPU 1004 may process the image data in accordance with the program being executed and output the results to the CPU 1001.

The devices 1021 to 102$x$, which are connected through the parallel I/O ports to the parallel I/O controller 1020, may be used when the exposure apparatus controller 40, another controller, or the like receives or sends the trigger signal or another timing signal.

The devices 1031 to 103$x$, which are connected through the serial I/O ports to the serial I/O controller 1030, may be used when the exposure apparatus controller 40, another controller, or the like sends or receives data.

The devices 1041 to 104$x$, which are connected through the analog ports to the A/D and D/A converter 1040, may serve as various sensors, such as the pulse energy measuring device 16$d$, the spectral width detector 16$e$, or the like.

The controllers thus configured may be capable of realizing the operations described in the embodiments.

The above descriptions are intended to be only illustrative rather than being limiting. Accordingly, it will be clear to those skilled in the art that various changes may be made to the embodiments of the present disclosure without departing from the scope of the appended claims.

The terms used in the present specification and the appended claims are to be interpreted as not being limiting. For example, the term "include" or "included" should be interpreted as not being limited to items described as being included. Further, the term "have" should be interpreted as not being limited to items described as being had. Furthermore, the modifier "a" or "an" as used in the present specification and the appended claims should be interpreted as meaning "at least one" or "one or more".

The invention claimed is:

1. A line narrowed laser apparatus configured to perform a plurality of burst oscillations including a first burst oscillation and a second burst oscillation next to the first burst oscillation to output a pulse laser beam, comprising:
    a laser resonator;
    a chamber provided in the laser resonator;
    a pair of electrodes provided in the chamber;
    an electric power source configured to apply a pulsed voltage to the pair of electrodes;
    a wavelength-selecting element provided in the laser resonator;
    a spectral width varying unit provided in the laser resonator;
    a wavelength variable unit configured to change a selected wavelength selected by the wavelength-selecting element; and
    a controller configured to control the wavelength variable unit based on an amount of control of the spectral width varying unit in a period from a time of ending the first burst oscillation to a time of starting the second burst oscillation.

2. The line narrowed laser apparatus according to claim 1, wherein
    the wavelength-selecting element includes at least one prism, and
    the wavelength variable unit changes the selected wavelength by changing posture of the at least one prism.

3. The line narrowed laser apparatus according to claim 1, further comprising:
    a wavelength detector provided in an optical path of the pulse laser beam outputted from the laser resonator, wherein
    the controller
        controls the wavelength variable unit during a period from the time of ending the first burst oscillation to the time of starting the second burst oscillation based on the amount of control of the spectral width varying unit from the time of ending the first burst oscillation to the time of starting the second burst oscillation, and
        controls the wavelength variable unit after the time of starting the second burst oscillation based on output from the wavelength detector.

4. The line narrowed laser apparatus according to claim 1, wherein the controller is capable of accessing a medium storing data showing a relation of an amount of change in the wavelength in the laser resonator to an amount of control of the spectral width varying unit, and the controller controls the wavelength variable unit based on the data stored in the medium.

5. The line narrowed laser apparatus according to claim 4, wherein the medium stores the amount of change in the wavelength in association with the amount of control of the spectral width varying unit.

6. The line narrowed laser apparatus according to claim 4, wherein the medium stores a gradient of the amount of change in the wavelength in association with the amount of control of the spectral width varying unit.

7. The line narrowed laser apparatus according to claim 4, further comprising:
    a wavelength detector provided in an optical path of the pulse laser beam outputted from the laser resonator, wherein
    the controller measures the relation of the amount of change in the wavelength to the amount of control of the spectral width varying unit based on output from the wavelength detector, and stores the relation in the medium.

8. The line narrowed laser apparatus according to claim 7, wherein the controller closes a shutter configured to suppress output of the pulse laser beam to an external device before measuring the relation of the amount of change in the wavelength to the amount of control of the spectral width varying unit.

9. The line narrowed laser apparatus according to claim 7, wherein the controller performs laser oscillation at a predetermined low duty to measure the relation of the amount of change in the wavelength to the amount of control of the spectral width varying unit.

10. The line narrowed laser apparatus according to claim 1, wherein the controller
   measures duty in the first burst oscillation and a length of a suspension period from the time of ending the first burst oscillation to the time of starting the second burst oscillation, and
   controls the wavelength variable unit based on the amount of control of the spectral width varying unit, the duty, and the length of the suspension period.

11. The line narrowed laser apparatus according to claim 1, wherein the spectral width varying unit is a wavefront variable unit to adjust a wavefront in a direction of dispersion of the wavelength-selecting element.

12. The line narrowed laser apparatus according to claim 11, wherein the wavefront variable unit includes a cylindrical concave lens and a cylindrical convex lens.

13. The line narrowed laser apparatus according to claim 12, wherein the wavefront variable unit further includes an actuator to change a distance between the cylindrical concave lens and the cylindrical convex lens.

14. The line narrowed laser apparatus according to claim 13, wherein
   the controller is capable of accessing a medium storing data showing a relation of an amount of change in the wavelength in the laser resonator to the distance between the cylindrical concave lens and the cylindrical convex lens changeable by the actuator, and
   the controller controls the wavelength variable unit based on the data stored in the medium.

15. The line narrowed laser apparatus according to claim 14, wherein the medium stores the amount of change in the wavelength in association with the distance between the cylindrical concave lens and the cylindrical convex lens changeable by the actuator.

16. The line narrowed laser apparatus according to claim 14, wherein the medium stores a gradient of the amount of change in the wavelength in association with the distance between the cylindrical concave lens and the cylindrical convex lens changeable by the actuator.

17. The line narrowed laser apparatus according to claim 14, further comprising:
   a wavelength detector provided in an optical path of the pulse laser beam outputted from the laser resonator, wherein
   the controller measures the relation of the amount of change in the wavelength to the distance between the cylindrical concave lens and the cylindrical convex lens changeable by the actuator based on output from the wavelength detector, and stores the relation in the medium.

18. The line narrowed laser apparatus according to claim 17, wherein the controller closes a shutter configured to suppress output of the pulse laser beam to an external device before measuring the relation of the amount of change in the wavelength to the distance between the cylindrical concave lens and the cylindrical convex lens changeable by the actuator.

19. The line narrowed laser apparatus according to claim 17, wherein the controller performs laser oscillation at a predetermined low duty to measure the relation of the amount of change in the wavelength to the distance between the cylindrical concave lens and the cylindrical convex lens changeable by the actuator.

20. The line narrowed laser apparatus according to claim 13, wherein the controller
   measures duty in the first burst oscillation and a length of a suspension period from the time of ending the first burst oscillation to the time of starting the second burst oscillation, and
   controls the wavelength variable unit based on the distance between the cylindrical concave lens and the cylindrical convex lens changeable by the actuator, the duty, and the length of the suspension period.

* * * * *